US012810851B2

(12) United States Patent
Biswas et al.

(10) Patent No.: US 12,810,851 B2
(45) Date of Patent: Nov. 24, 2026

(54) MULTI-SESSION CONTEXT

(71) Applicant: Amazon Technologies, Inc., Seattle, WA (US)

(72) Inventors: Arjit Biswas, Dublin, CA (US); Shishir Bharathi, Bellevue, WA (US); Anushree Venkatesh, San Mateo, CA (US); Yun Lei, Los Altos, CA (US); Ashish Kumar Agrawal, Mountain View, CA (US); Siddhartha Reddy Jonnalagadda, Bothell, WA (US); Prakash Krishnan, Santa Clara, CA (US); Arindam Mandal, Redwood City, CA (US); Raefer Christopher Gabriel, San Jose, CA (US); Abhay Kumar Jha, Belmont, CA (US); David Chi-Wai Tang, Palo Alto, CA (US); Savas Parastatidis, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/439,166

(22) Filed: Feb. 12, 2024

(65) Prior Publication Data

US 2024/0185846 A1 Jun. 6, 2024

Related U.S. Application Data

(63) Continuation of application No. 17/361,761, filed on Jun. 29, 2021, now Pat. No. 11,908,463.

(51) Int. Cl.

| | |
|---|---|
| ***G06F 40/35*** | (2020.01) |
| ***G06F 40/279*** | (2020.01) |
| ***G10L 15/18*** | (2013.01) |
| ***G10L 15/183*** | (2013.01) |
| ***G10L 15/22*** | (2006.01) |
| *G06F 40/295* | (2020.01) |
| *G06F 40/30* | (2020.01) |
| *G10L 15/19* | (2013.01) |

(52) U.S. Cl.

CPC .......... *G10L 15/183* (2013.01); *G06F 40/279* (2020.01); *G10L 15/1815* (2013.01); *G10L 15/22* (2013.01); *G06F 40/295* (2020.01); *G06F 40/30* (2020.01); *G06F 40/35* (2020.01); *G10L 15/1822* (2013.01); *G10L 15/19* (2013.01); *G10L 2015/228* (2013.01)

(58) Field of Classification Search

None

See application file for complete search history.

(56) References Cited

U.S. PATENT DOCUMENTS 9,269,354 B2 * 2/2016 Gandrabur .......... G10L 15/1815
9,754,591 B1 * 9/2017 Kumar .................... G10L 15/22

(Continued)

*Primary Examiner* — Richard Z Zhu

(74) *Attorney, Agent, or Firm* — Pierce Atwood LLP

(57) ABSTRACT

Techniques for storing and using multi-session context are described. A system may store context data corresponding to a first interaction, where the context data may include action data, entity data and a profile identifier for a user. Later the stored context data may be retrieved during a second interaction corresponding to the entity of the second interaction. The second interaction may take place at a system different than the first interaction. The system may generate a response during the second interaction using the stored context data of the prior interaction.

18 Claims, 10 Drawing Sheets

(56) References Cited

U.S. PATENT DOCUMENTS

| | | | | |
|---|---|---|---|---|
| 9,875,494 | B2 * | 1/2018 | Kalns | G10L 15/32 |
| 9,922,642 | B2 * | 3/2018 | Pitschel | G10L 15/063 |
| 10,079,013 | B2 * | 9/2018 | Kalns | G10L 15/1822 |
| 10,108,608 | B2 * | 10/2018 | Williams | G06F 40/58 |
| 10,394,886 | B2 * | 8/2019 | Kemp | G06F 40/295 |
| 10,496,905 | B2 * | 12/2019 | Solomon | G10L 15/22 |
| 10,567,515 | B1 * | 2/2020 | Bao | G10L 17/22 |
| 10,629,186 | B1 * | 4/2020 | Slifka | G06F 40/295 |
| 10,854,195 | B2 * | 12/2020 | Lee | G10L 15/22 |
| 10,997,968 | B2 * | 5/2021 | Wanas | G06F 40/295 |
| 11,195,523 | B2 * | 12/2021 | Hall | G06F 40/295 |
| 11,200,885 | B1 * | 12/2021 | Mandal | G06F 16/3329 |
| 11,211,058 | B1 * | 12/2021 | Eakin | G10L 15/197 |
| 11,256,868 | B2 * | 2/2022 | Ge | G06F 16/3325 |
| 11,289,074 | B2 * | 3/2022 | Lee | G06N 20/00 |
| 11,514,903 | B2 * | 11/2022 | Ohmura | G06F 40/40 |
| 11,948,566 | B2 * | 4/2024 | Brdiczka | G10L 15/22 |
| 12,033,618 | B1 * | 7/2024 | Wei | G10L 15/28 |
| 2012/0265528 | A1 * | 10/2012 | Gruber | G10L 15/183<br>704/235 |
| 2014/0229405 | A1 * | 8/2014 | Govrin | G06Q 40/02<br>706/50 |
| 2014/0244266 | A1 * | 8/2014 | Brown | G06F 9/453<br>715/764 |
| 2014/0244712 | A1 * | 8/2014 | Walters | H04L 67/10<br>709/202 |
| 2015/0039292 | A1 * | 2/2015 | Suleman | G10L 15/22<br>704/9 |
| 2015/0120287 | A1 * | 4/2015 | Stern | G10L 15/183<br>704/231 |
| 2015/0332672 | A1 * | 11/2015 | Akbacak | G06F 16/3329<br>704/257 |
| 2019/0103092 | A1 * | 4/2019 | Rusak | G06N 3/045 |
| 2019/0287517 | A1 * | 9/2019 | Green | H04M 3/2281 |
| 2019/0294676 | A1 * | 9/2019 | Sapugay | G10L 15/19 |
| 2019/0318724 | A1 * | 10/2019 | Chao | G10L 15/183 |
| 2020/0143814 | A1 * | 5/2020 | Moniz | G10L 17/06 |
| 2021/0089531 | A1 * | 3/2021 | Hu | G06F 16/90 |

* cited by examiner

MULTI-SESSION CONTEXT

CROSS-REFERENCE TO RELATED APPLICATIONS

This application is a continuation of, and claims priority to, U.S. patent application Ser. No. 17/361,761, entitled "MULTI-SESSION CONTEXT", filed on Jun. 29, 2021, the contents of which are incorporated by reference herein in its entirety.

BACKGROUND

Natural language processing systems have progressed to the point where humans can interact with and control computing devices using their voices. Such systems employ techniques to identify the words spoken by a user based on the various qualities of received input data. Speech recognition combined with natural language understanding processing techniques enable speech-based user control of computing devices to perform tasks based on the spoken inputs. Speech recognition and natural language understanding processing techniques are sometimes referred to collectively or separately as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1A:
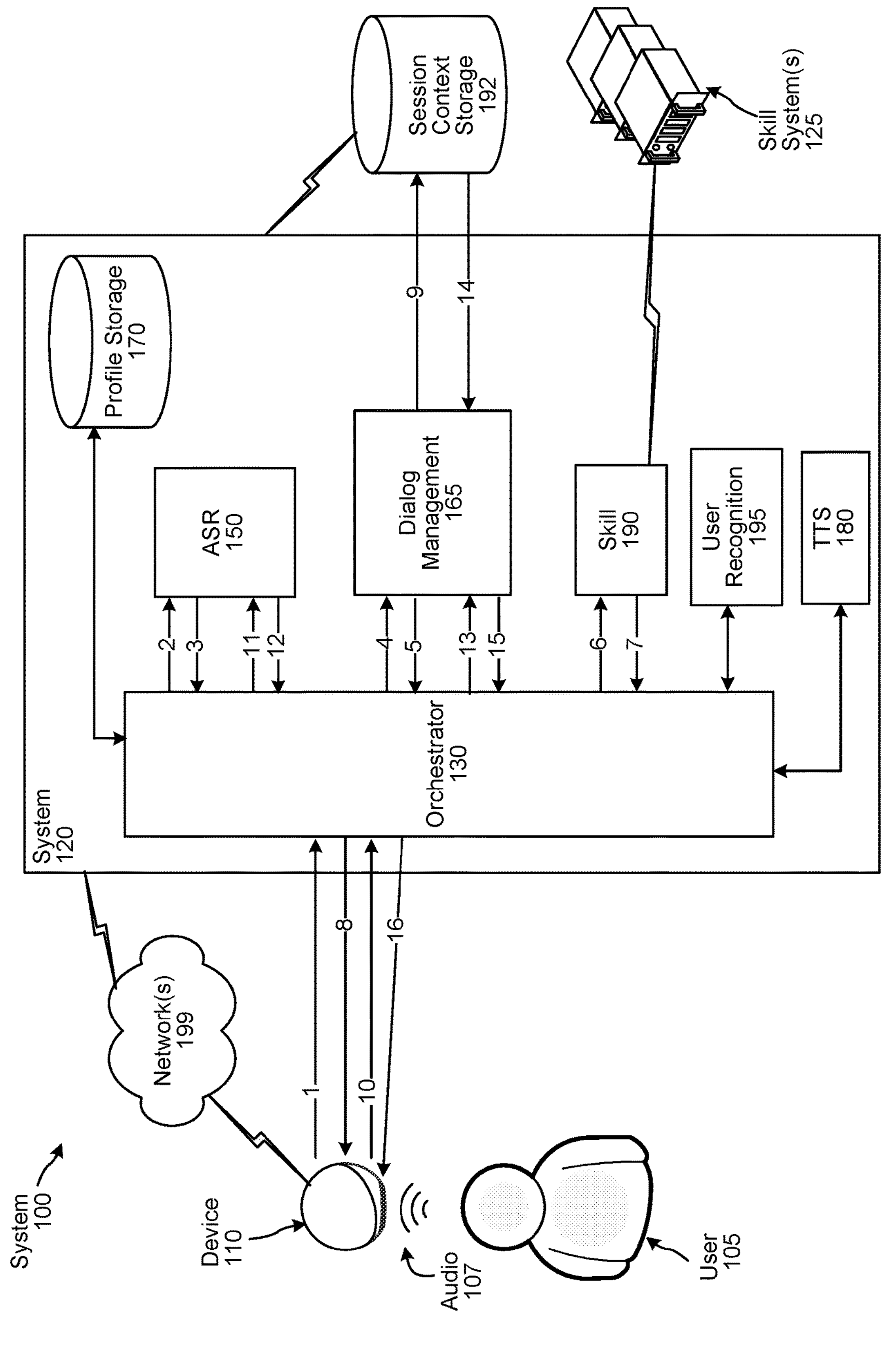
FIG. 1A is a conceptual diagram illustrating an example configuration of a system for using data from a previous session to determine a system response in a current session, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Dialog processing, as used herein, is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems often need to recognize, retain, and use information collected during more than one input during a back-and-forth or "multi-turn" interaction with the user.

The system may be configured to respond to the user across multiple exchanges between the user and the system. For example, the user may ask the system "play me some music" and the system may respond "what are you in the mood for?" The user may respond "something relaxing" and the system may respond "how about smooth jazz?" Such exchanges may be part of an ongoing conversation between the system and a user, which may be referred to as a dialog. As used herein, a "dialog," "dialog session," "session," or the like refers to various related user inputs and system outputs, for example inputs and outputs related to an ongoing exchange between a user and the system.

A dialog may be goal-oriented, meaning the dialog is directed to the system performing a specific action requested by a user (such as figuring out what music the system should play). Alternatively, a dialog may not be goal-oriented, for example as part of a freeform conversation between the system and a user that may not have a definite end point or action in mind at the end of the conversation. System components that control what actions the system takes in response to various user inputs of a dialog may sometimes be referred to as chatbots.

A user input and performance by the system of a corresponding action, responsive to the user input, may be referred to as a dialog "turn." A session identifier may be associated with multiple related turns corresponding to consecutive related user inputs. One user input may be considered related to a subsequent user input, thereby causing a single session identifier to be associated with both user inputs, based on, for example, a length of time between receipt of the first user input and receipt of the subsequent user input and/or a length of time between performance of an action responsive to the first user input and receipt of the subsequent user input.

Systems configured to engage in dialogs with a user may use the session identifier or other data to track the progress of the dialog to select system responses in a way that tracks the previous user-system exchanges, thus moving the dialog along in a manner that results in a desirable user experience.

Some systems may only retain information for use during a current session. That is, if the user stops the interaction before achieving the goal, and comes back later to finish the goal, the system may not retain any information provided during the prior session, and the user may have to provide the information for the goal again.

The present disclosure relates to a system that retains information for a dialog session after the session has ended, and enables use of the retained information during another dialog session that may take place at the same device as the prior session or at a different device and/or system. For example, a user may start a dialog session by providing spoken inputs with a goal to buy a TV. As part of this dialog session, the user may provide some information for the type of TV the user is looking for (e.g., size, brand, price range, etc.). The user may walk away (end the dialog session) before completing the goal—purchasing a TV. The system stores context data including the information provided by the user during the dialog session, such as the size, brand, and price range for the TV. Then, at a later time, the user may start another dialog session with the same goal of buying a TV. The system retrieves the context data from the prior dialog session, and determines a system response (of a turn of the second dialog session) using the context data. For example, the system may output audio data representing the synthesized speech "do you want to continue with your search for a TV with the [size], [brand] and [price range]," where the [size], [brand] and [price range] are included from the context data. Thus, the user does not have to start over.

As a further example, the user may continue searching for a TV using a different device/system, such as, a website or an app corresponding to a skill, installed at the user's device. The system retrieves the context data for the prior dialog session, and loads the size, brand and price range information at the website or the app. Thus, the user is able to continue the goal using a different system and a different device.

The system of the present disclosure stores context data for a session. Such context data is associated with a profile identifier for the user, and includes an intent of the interaction session. When a new session is started, the system retrieves the appropriate context data (if available) based on the profile identifier and the intent of the new session. In determining a system response to a user input of the new session, the system uses the retrieved context data. For example, the system may confirm with the user to continue with the goal of the previous session. As another example, the system may perform an action using information included in the context data, such as presenting search results based on criteria the user provided in the prior session.

The stored context data may include intent information and entity information provided by the user, and data representing system responses (e.g., API call, skill invoked, etc.) generated during the session, rather than including entire user inputs and detailed information of the system responses. This enables different systems to use the context data, when the different systems are configured to process different types of data.

Teachings of the present disclosure may be configured to incorporate user permissions and may only be performed if approved by a user. As such, the systems, devices, components, and techniques described herein would be typically configured to restrict processing where appropriate and only process user data in a manner that ensures compliance with all appropriate laws, regulations, standards, and the like. The teachings of the present disclosure can be implemented on a geographic basis to ensure compliance with laws in various jurisdictions and entities in which the computing components and/or user are located.

As used herein, a "domain" may refer to a collection of related functionality. A domain may be associated with one or more skills performing related functionality may be part of a domain. A non-limiting list of domains includes a smart home domain (corresponding to smart home functionality), a music domain (corresponding to music functionality), a video domain (corresponding to video functionality), a weather domain (corresponding to weather functionality), a communications domain (corresponding to one- or two-way communications functionality), and a shopping domain (corresponding to shopping functionality).

As used herein, a "skill" may refer to software, that may be placed on a machine or a virtual machine (e.g., software that may be launched in a virtual instance when called), configured to process natural language understanding (NLU) output data (e.g., including an intent and optionally one or more entities) and perform one or more actions in response thereto. What is referred to herein as a skill may sometimes be referred to as an application, bot, action, or the like. A group of skills of related functionality may be associated with a domain. For example, a first music skill and a second music skill may be associated with a music domain.

FIG. 1A shows a system 100 configured to use data from a previous session in determining a system response in a current session, in accordance with example embodiments. As shown in FIG. 1A, the system 100 may include a device 110, local to a user 105, connected to a system 120 across one or more networks 199. The network(s) 199 may include the Internet and/or any other wide- or local-area network, and may include wired, wireless, and/or cellular network hardware. Although the figures and discussion of the present disclosure illustrate certain steps in a particular order, the steps described may be performed in a different order (as well as certain steps removed or added) without departing from the present disclosure.

The system 120 may be a speech processing system configured to process spoken natural language inputs using ASR processing. The system 120 may include multiple components to facilitate speech processing, such as, an orchestrator component 130, an ASR component 150, a dialog management component 165, and one or more skill components 190. The system 120 may also include a profile storage 170, a TTS component 180, and a user recognition component 195 to facilitate processing of users inputs and generating outputs. The system may also communicate with one or more skill systems 125 and a session context storage 192.

Referring to FIG. 1A, the user 105 may speak a first input, and the device 110 may capture audio 107 representing the first spoken input. For example, the user 105 may say "Alexa, I want to buy a TV" or "Alexa, search for TVs." In other examples, the user 105 may provide another type of input (e.g., selection of a button, selection of displayed graphical interface elements, may perform a gesture, etc.). The device 110 may send (step 1) audio data (or other type of input data, such as, image data, text data, etc.) corresponding to the first user input to the system 120 for processing.

The orchestrator component 130 may receive the input data from the device 110. In the case that the input data is audio data, the orchestrator component 130 may send (step 2) the audio data to the ASR component 150, and the ASR component 150 may process the audio data to determine ASR data (e.g., token data, text data, one or more ASR hypotheses including token or text data and corresponding confidence scores, etc.) corresponding to the words spoken by the user 105. Details on how the ASR component 150 may process the audio data are described below. The ASR component may send (step 3) the ASR data to the orchestrator component 130.

The orchestrator component 130 may send (step 4) the ASR data to the dialog management component 165.

The dialog management component 165 may be configured to keep track of a turn-based dialog between the user 105 and the system 120. The dialog management component 165 may associate a first session identifier with the received ASR data. Using the ASR data, the dialog management component 165 may determine a first system response to the first user input. Details on how the dialog management component 165 may determine the first system response are described below in relation to FIGS. 3-5. For example, the dialog management component 165 may determine an action to perform in response to the first user input using the ASR data. In some cases, the dialog management component 165 may determine a goal of the dialog session, and may request more information from the user 105. For example, for the user input "Alexa, I want to buy a TV," the dialog management component 165 may determine the goal as searching for a TV to purchase. To help the user 105 achieve the goal, the dialog management component 165 may ask the user 105 to provide some information regarding the type of TV the user wants to buy. The dialog management component 165 may determine the system response is to include synthesized speech requesting the additional information. For example, the synthesized speech may be "what size of TV are you looking for," "what brand of TV are you looking for," and/or "what price range are you looking for." The user 105 may provide additional spoken inputs (or other types of input) in response to the dialog management component 165 requesting additional information. The dialog management component 165 may receive data corresponding to the additional user inputs, and may associate these inputs with the first session identifier, based on the additional user inputs being part of the same dialog session. The system responses may also be associated with the first session identifier. Although the additional turns of the dialog session are not shown as steps in FIG. 1A, it should be understood that audio data representing spoken inputs may be processed by the ASR component 150. In some embodiments, the ASR data generated by the ASR component 150 for the additional user inputs for the dialog session may be processed by the dialog management component 165 to determine an entities corresponding to the additional user inputs and system responses to the additional user inputs.

In some cases, the dialog management component 165 may determine to invoke a skill component 190 to determine a system response to a user input. In the example shown in FIG. 1A, the dialog management component 165 may send (step 5), to the orchestrator component 130, a command to invoke a skill component 190. The dialog management component 165 may also send other data to the orchestrator component 130, such as the ASR data corresponding to the first and any additional user inputs for the dialog session. In other embodiments, the dialog management component 165 may send other data such as action data representing an action to be performed by the skill component 190 and data needed to perform the action (e.g., entity data). Continuing with the example for searching for a TV, the dialog management component 165 may determine to invoke a shopping skill, and may send a command to the shopping skill (via the orchestrator component 130) to search for a TV that satisfies one or more of the criteria (e.g., size, brand, price range, etc.) that the user 105 provided via the additional user inputs. The orchestrator component 130 may send (step 6), to the skill component 190, the command from the dialog management component 165 along with any other data provided by the dialog management component 165.

The skill component 190 may determine one or more search results that satisfy the criteria (e.g., TV size, brand, and price range) provided by the dialog management component 165. The skill component 190 may send (step 7) output data corresponding to the search results to the orchestrator component 130. The orchestrator component 130 may send (step 8) the output data to the device 110 for output. The output data, determined by the skill component 190, may be text data, token data, or other structured data corresponding to a natural language output. This output data may be processed by the TTS component 180 to generate audio data representing synthesized speech corresponding to the natural language output, and the device 110 may playback the audio data. In other cases, the output data may be text data and/or image data which may be displayed by the device 110. Continuing with the above example about searching for a TV, the output data may be natural language text data summarizing the search results determined by the skill component 190. For example, the natural language text data may be "I found a [size] TV by [brand] for [price_1], and another [size] TV by [brand] for [price_2]. Would you like more information for them?"

The user 105 may continue the dialog session or may decide to stop. The dialog management component 165 may determine, at some point, that the dialog session has ended. This determination may be based on the user 105 providing a user input indicating so. For example, the user 105 may say "stop search" or "I'll try again later." As another example, the dialog management component 165 may determine the dialog session has ended based on the user 105 pressing a button on the device 110 to turn off the device 110 or cause the device 110 to enter a screen-saver mode. The dialog management component 165 may alternatively determine that the dialog session has ended based on not receiving a user input from the user 105 within a period of time (e.g., 30 seconds) after the device 110 presented a most-recent system response of the dialog session.

Based on determining that the dialog session has ended, the dialog management component 165 may store (step 9) context data for the dialog session in the session context storage 192. The dialog management component 165 may determine the context data to include intent data and entity data for each user input of the dialog session, and the system response for each user input. The system response may be the natural language output or other type of output. The system response may be a skill identifier corresponding to the skill component 190 invoked to respond to the user input. As described below in relation to FIGS. 3 and 4, the dialog management component 165 may determine an action and may make an API call to determine the system response to a user input. In some embodiments, the dialog management component 165 may determine the context data to include the API call, the data included in the call (i.e. the arguments of the API call), and the system response for each user input of the dialog session. Continuing with the above example relating to searching for a TV, the dialog management component 165 may determine the context data to include {intent: <Purchase>, entity: TV; entity: [size]; entity: [brand]; entity: [price range]}. The dialog management component 165 may associate the context data with a profile identifier for the user 105. The profile identifier may be an identifier from the profile storage 170 for the user 105.

The session context storage 192 may be in (wireless or wired) communication with the system 120. In some embodiments, there may be more than one storage for storing context data, where each storage may correspond to a different domain or skill. For example, the first session context storage 192 may correspond to the shopping domain or a first shopping skill, a second session context storage may correspond to the music domain or a first music skill, etc. In other embodiments, the one session context storage 192 may store context data with a domain identifier and/or a skill identifier to identify which domain and/or skill the context data relates to.

After the context data is stored, the user 105 may provide another (second) user input. This user input may be provided some time after the dialog session including the first user input ended (e.g., 1 hour after the dialog session ended, 1 day after the dialog session ended, 1 week after the dialog session ended, etc.). The user 105 may speak the second user input, the device 110 may capture audio corresponding to the spoken input, and the device 110 may send (step 10) audio data corresponding to the second user input to the system 120. The user 105 may alternatively provide another type of (second) input, such as selection of a button on the device 110, selection of a displayed graphical interface at the device 110, a gesture, etc. The device 110 may send (step 10) the corresponding input data to the system 120 for processing.

When the orchestrator component 130 receives audio data at step 10, the orchestrator component 130 may send (step 11) the audio data corresponding to the second user input to the ASR component 150, the ASR component 150 may process to determine ASR output data, and the ASR component 150 may send (step 12) the ASR data (e.g., one or more ASR hypotheses, each including text data or token data, and a corresponding confidence score) corresponding to the second user input to the orchestrator component 130. The orchestrator component 130 may send (step 13) the ASR data to the dialog management component 165 for processing. In the case that the input is other than a spoken input, then the input data received from the device 110 may be sent, by the orchestrator component 130, to the dialog management component 165 for processing.

The dialog management component 165 may associate a second session identifier with the received ASR data. In some cases, the dialog management component 165 may determine context data is to be retrieved from the session context storage 192. The dialog management component 165 may search for context data that is associated with the profile identifier for the user 105, and that corresponds to the second user input. The dialog management component 165 may search for context data that corresponds to one or more entities included in the second user input. For example, the second user input may be "Alexa, I want to buy a TV" or "Alexa, go back to my search for TVs." The dialog management component 165 may retrieve (step 14) the context data stored at step 11, which may include entity data relating to a size, a brand and/or a price range that the user 105 indicated as criteria for a TV.

The dialog management component 165 may determine a system response using the retrieved context data, and the ASR data and entities corresponding to the second user input. Details on how the dialog management component 165 may determine a system response to a user input are described below in relation to FIGS. 3 and 4. For example, the dialog management component 165 may use a dialog simulator and/or an action selector to determine a system response to a user input. The dialog simulator may determine whether or not the system is to "say" something in response to the user input and what the system should "say" in response to the user input. In such cases, the system may output audio data representing synthesized speech corresponding to what the dialog simulator determines the system should say. The action selector may determine what action the system should perform in response to the user input, and may determine a corresponding API to perform the action. The dialog management component 165 may determine which data is needed to call the API, and whether that data is already available (e.g., the user input of the current dialog session includes the data, the context data from the previous dialog session includes the data, user profile data includes the data, etc.) or the system needs to request the data from the user 105.

In some cases, the dialog management component 165 may confirm with the user 105 that the user wants to continue with the previous session. The dialog management component 165 may determine the entity data included in the context data, and may confirm with the user 105 to continue with that entity data. The dialog management component 165 may generate output data, such as, text data, token data or other structured data corresponding a natural language output, and may send the output data to the orchestrator 130 for output at the device 110. The output data, generated by the dialog management component 165, may be processed by the TTS component 180 to generate audio data representing synthesized speech. Continuing with the example relating to the search for a TV, the dialog management component 165 may output "do you want to continue searching for a [size] TV by [brand] in the [price range]" where the [size], [brand] and [price range] may be included in the context data.

In some cases, the dialog management component 165 may send a command, via the orchestrator component 130, to the skill component 190 to perform an action, where the command may include at least the entity data from the context data (and the intent data from the context data or the NLU data corresponding to the second user input). The skill component 190 may generate the output data corresponding to the system response to the second user input. For example, the command may request more information for a particular search result for a TV, and the output data may include such information. As another example, the command may request a (updated) search using the criteria represented in the entity data, and the output data may include (updated) search results (e.g., a price for a TV may have changed since the last search/previous dialog session).

As such, the dialog management component 165 may send (step 15) output data corresponding to the system response to the orchestrator component 130. In some cases, the orchestrator component 130 may send (step 16) the output data to the device 110 for output to the user 105. In other cases (not shown) the orchestrator component 130 may send a command from the dialog management component 165 to the skill component 190, and the skill component 190 may send output data to the orchestrator component 130 for output via the device 110.

In this manner, context data from a previous dialog session is used to determine a system response for a current dialog session. The context data for the previous dialog session may include certain information, so that it can be used during the current dialog session without requiring additional processing. Storing such context data also enables other systems to use the context data, as described below in relation to FIG. 1B, where the other systems may not be configured to process data that is generated and processed by the system 120 (e.g., a speech processing system).

Figure 1B:
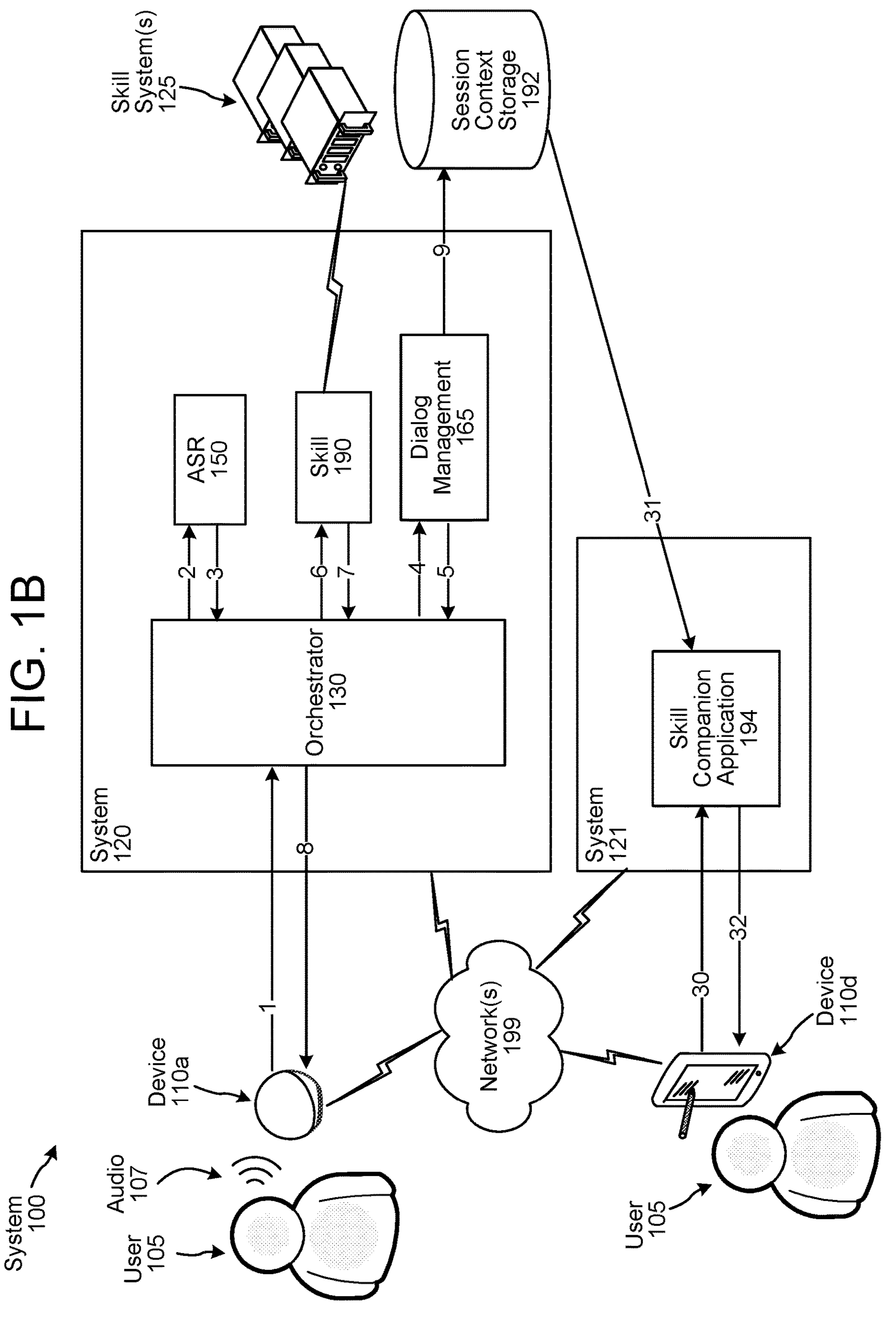
FIG. 1B is a conceptual diagram illustrating an example configuration of a system for using data from a previous session at a first device to determine a system response in a current session at a second device, according to embodiments of the present disclosure.

As shown in FIG. 1B, the system 100 may include a device 110*d*, local to the user 105, and a system 121 connected across the network(s) 199. The system 121 may include the skill companion application 194, which may correspond to the skill component 190. For example, the skill component 190 may be a shopping skill, and the skill companion application 194 may be a shopping "app" that may provide similar functionalities as the skill component 190 but via non-speech interactions.

Referring to FIG. 1B, the system 100 may perform the steps 1 to 9 as described above in relation to FIG. 1A. That is, context data for a dialog session between the user 105 and the device 110*a* may be stored (step 9) at the session context storage 192 after the dialog session ends. The context data may be associated with the profile identifier for the user 105, and may include intent data and entity data corresponding to the dialog session. Sometime after the dialog session ends (e.g., after 1 hour, after 1 day, after 1 week, etc.), the user 105 may interact with the skill companion application 194 using the device 110*d* (e.g., a tablet, a laptop, a smartphone, etc.). The user 105 may launch/open the skill companion application 194 at the device 110*d*, and may provide one or more (second) user inputs using a user interface screen for the skill companion application 194. The user 105 may provide the second user input(s) using a touchscreen interface of the device 110*d*, a keyboard, a mouse, or other input interface. The device 110*d* may send (step 30), to the skill companion application 194, input data corresponding to the second user input(s). The device 110*d* may also send, to the skill companion application 194, the profile identifier for the user 105. In some embodiments, the device 110*d* may identify the profile identifier based on the user 105 logging in to the skill companion application 194 using a username that may correspond to the profile identifier stored at the profile storage 170 for the user 105. That is, the profile storage 170, the skill component 190 and/or the skill companion application 194 may store an association between the profile identifier and the username (or other credentials) the user 105 uses to access the skill companion application 194. In some cases, the user 105 may use the same username (or other credentials) to access the functionalities of the system 120, the skill component 190 and the skill companion application 194.

The skill companion application 194 may determine an intent of the second user input(s). For example, the user 105 may search for a TV using a search/text field displayed at the device 110*d*. The skill companion application 194 may retrieve (step 31) the context data, from the session context storage 192, based on the intent and the profile identifier for the user 105. For example, the skill companion application 194 may search the session context storage 192 using the intent for the second user input(s) and the profile identifier. In the embodiments where there is a single storage 192 for different domains or different skills, the skill companion application 194 may also search the session context storage 192 using a skill identifier for the skill component 190 with which the skill companion application 194 is associated. Thus, the skill companion application 194 may retrieve context data that relates to the same user 105, intent, and skill as a previous session.

The skill companion application 194 may determine a system response (e.g., output data) to the second user input(s) using at least the context data and the second user input(s). As described above, the context data may include one or more entities that the user 105 may have provided in the previous dialog session. Continuing with the example relating to searching for a TV, the context data may include [size], [brand], and [price range]. In this example, the skill companion application 194 may populate one or more search fields with the [size], [brand] and/or [price range], included in the context data. The skill companion application 194 may send (step 32) data corresponding to the system response to cause the device 110*d* to display the system response in the user interface screen for the skill companion application 194. For example, the user interface screen at the device 110*d* may update to show the [size], [brand] and/or [price range] in the appropriate portions of the user interface screen.

In this manner, the system 100 enables context data from a prior session that may take place at a different device 110*a* with a different system 120 to be used in a current session that may take place at a different device 110*d* with a different system 121. Thus, the user 105 can continue to achieve a goal of a prior session at a different device using a different system. That is, the user 105 may initiate a goal-oriented session at the system 120 using spoken inputs, and, at a later time, may continue the goal-oriented session at the system 121 using touch or text-based inputs.

In some embodiments, the skill companion application 194 may associate a second session identifier with the input data received from the device 110*d* in the step 30. The skill companion application 194 may use the second session identifier to track the user input(s) and the response(s) from the system 121. After this session is ended (e.g., the user 105 closes the skill companion application 194), the skill companion application 194 may store context data at the session context storage 192. This context data may include the intent of the second user input(s), and any entities included in the second user input(s). The format of the context data and the type of data stored by the skill companion application 194 may be the same/similar to the format of the context data and the type of data stored by the dialog management component 165, so that the dialog management component 165 may use the context data from the skill companion application 194 in any subsequent sessions started by the user 105 at the system 120.

FIGS. 1A and 1B illustrate the dialog management component 165 storing context data for a dialog session. One or more components of the skill companion application 194 or the system 121 may also store context data for a session that occurs using the system 121. The user 105 may access the skill companion application 194 using an app installed at the device 110*d* or using a web browser installed at the device 110*d*. The user 105 may provide inputs in the form of selecting a graphical user interface element (e.g., a button, a tab, a radio button, a drop down list, etc.), entering text in a text field, etc. The device 110*d* may send data, indicating the inputs provided by the user 105, to the system 121. The system 121 may determine an intent and one or more entities based on the inputs. When the interaction is over, the system 121 may store context data including the intent and the one or more entities. Later, the user 105 may start a dialog session with the system 120, and the dialog management component 165 may retrieve the context data stored by the system 121 to determine a system response.

In some embodiments, the dialog management component 165 and/or the system 121 may store context data when certain conditions are met. In an example embodiment, context data may only be stored for certain intents. For example, when the dialog session/interaction session corresponds to a <Search> intent, context data may be stored; when the dialog session/interaction session corresponds to a <Shipping> intent, context data may not be stored. The dialog management component 165 and/or the system 121 may include a list of intents for which context data can be stored. In another example embodiment, the context data may not include certain types of information (e.g., sensitive information, personal information, confidential information, etc.). For example, if the user 105 provides payment information (e.g., credit card number, billing address, bank account number, etc.), then the context data stored for that session may not include such payment information.

In some embodiments, the dialog management component 165 or the system 121 may store context data when a dialog session or interaction session ends. The dialog management component 165 may determine that the dialog session has ended based on the user 105 indicating so, based on the skill component 190 ending its skill session, based on an error occurring during processing of a user input, or other factors. The system 121 may determine that the interaction session has ended based on the user 105 exiting the app (in communication with the skill companion application 194) at the device 110*b*, closing the web browser (that was displaying a webpage of the skill companion application 194) at the device 110*d*, based on an error occurring during processing of a user input, or other factors.

In some embodiments, the dialog management component 165 or the system 121 may store context data after a certain event occurs in the session, such as the intent or the goal of the session changing. For example, a subsequent user input may correspond to a different intent (e.g., a <Shipping> intent) than the intent of a previous user input (e.g., a <Search> intent), then the dialog management component 165 or the system 121 may store context data (before the session ends) for the portion of the session including the previous user input and not including the subsequent user input. As another example, a subsequent user input may navigate to a different portion of the app as compared to a previous user input and, as a result, the system 121 may store context data (before the session ends) for the portion of the session including the previous user input and not including the subsequent user input. As yet another example, a subsequent user input may relate to a different entity (e.g., a computer) than a previous user input of the session (e.g., a TV) and, as a result, the dialog management component 165 or the system 121 may store context data for the portion of the session including the previous user input and not including the subsequent user input.

In some embodiments, the dialog management component 165 or the system 121 may search the session context storage 192 for context data based on an intent of a current user input along with the profile identifier for the user 105. For example, if the intent of the current user input is a <Search> intent, then the dialog management component 165 or the system 121 may search for context data, associated with the profile identifier for the user 105, that includes the <Search> intent. In some embodiments, the dialog management component 165 or the system 121 may receive multiple different instances of context data, and may select one or more instances of the context data to use based on an entity(ies) included in the current user input. For example, if first context data includes {intent: <Search>; entity: "TV" }, second context data includes {intent: <Search>; entity: "computer" }, and the current user input includes the entity "TV", then the dialog management component 165 or the system 121 may select the first context data for determining a system response. In other embodiments, the dialog management component 165 or the system 121 may search the session context storage 192 using one or more entities included in the user input, so as to only receive context data that includes the intent and entity(ies) of the current user input.

In some embodiments, the dialog management component 165 or the system 121 may search the session context storage 192 for context data including an intent that matches the intent of the current user input. In other embodiments, the dialog management component 165 or the system 121 may search the session context storage 192 for context data including an intent that is similar to the intent of the current user input, which takes into account that different systems may have different names for the same intent.

In some embodiments, the session context storage 192 may store context data for a period of time, depending on system configurations, and delete the context data after the period of time expires (e.g. after 30 days). The user 105 may request context data to be deleted (via the system 120 or the system 121) and, as a result, context data associated with the profile identifier for the user 105, or the context data particularly indicated by the user 105, may be deleted from the session context storage 192. Context data may also be deleted from the session context storage 192 when certain events occur, such as the user 105 canceling his/her account with the system 120 or the system 121, the user 105 setting a privacy mode indicating that context data cannot be stored for multi-session use and/or cross-system sessions, etc.

The system 120 may use other components illustrated in FIG. 1A. The various components shown in FIG. 1A may be located on a same or different physical devices. Communication between various components may occur directly or across the network(s) 199.

In some embodiments, the system 120 may include a NLU component (not shown), which may process ASR data or other input data (e.g., textual input from the user 105, gesture input from the user 105, etc.) to determine an intent and any entities corresponding to a user input. The NLU component may also determine a domain corresponding to the user input. The NLU component may generate NLU data corresponding to the user input, where the NLU data may include one or more NLU hypotheses, each including an intent, one or more entities (if applicable), and a confidence score. For the user input "Alexa, I want to buy a TV," the NLU component may determine the NLU data to be {intent: <Purchase>, entity: "TV", confidence score: [value]}. The NLU component may send the NLU data to the orchestrator component 130, and the orchestrator component 130 may send the NLU data to the dialog management component 165 or the skill component 190 for processing.

A microphone or array of microphones (of or otherwise associated with the device 110) may capture audio. The device 110 processes audio data, representing the audio, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data, the device 110 may determine if the speech is directed at the device 110/system 120. In at least some embodiments, such determination may be made using a wakeword detection component 220 (shown in FIG. 2). The wakeword detection component 220 may be configured to detect various wakewords. In at least some examples, each wakeword may correspond to a name of a different digital assistant. An example wakeword/digital assistant name is “Alexa.”

Wakeword detection is typically performed without performing linguistic analysis, textual analysis, or semantic analysis. Instead, the audio data is analyzed to determine if specific characteristics of the audio data match preconfigured acoustic waveforms, audio signatures, or other data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid deep neural network (DNN)-HMM decoding framework. In another example, the wakeword detection component 220 may be built on DNN/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 220 detects a wakeword, the device 110 may “wake” and begin transmitting audio data 211, representing the audio, to the system 120. The audio data 211 may include the detected wakeword, or the device 110 may remove the portion of the audio data, corresponding to the detected wakeword, prior to sending the audio data 211 to the system 120.

Referring to FIG. 1A, the orchestrator component 130 may be configured to, among other things, coordinate data transmissions between components of the system 120. The orchestrator component 130 may receive audio data from the device 110, and send the audio data to the ASR component 150.

The ASR component 150 transcribes the audio data into ASR output data including one or more ASR hypotheses. An ASR hypothesis may be configured as a textual interpretation of the speech in the audio data, or may be configured in another manner, such as one or more tokens. Each ASR hypothesis may represent a different likely interpretation of the speech in the audio data. Each ASR hypothesis may be associated with a score (e.g., confidence score, probability score, or the like) representing the associated ASR hypothesis correctly represents the speech in the audio data.

The ASR component 150 interprets the speech in the audio data based on a similarity between the audio data and pre-established language models. For example, the ASR component 150 may compare the audio data 211 with models for sounds (e.g., subword units, such as phonemes, etc.) and sequences of sounds to identify words that match the sequence of sounds of the speech represented in the audio data.

In at least some instances, instead of the device 110 receiving a spoken natural language input, the device 110 may receive a textual (e.g., types) natural language input. The device 110 may determine text data representing the textual natural language input, and may send the text data to the system 120, wherein the text data is received by the orchestrator component 130. The orchestrator component 130 may send the text data or ASR output data, depending on the type of natural language input received, to a NLU component.

The NLU component processes the ASR output data or text data to determine one or more NLU hypotheses embodied in NLU output data. The NLU component may perform intent classification (IC) processing on the ASR output data or text data to determine an intent of the natural language input. An intent corresponds to an action to be performed that is responsive to the natural language input. To perform IC processing, the NLU component may communicate with a database of words linked to intents. For example, a music intent database may link words and phrases such as “quiet,” “volume off,” and “mute” to a <Mute> intent. The NLU component identifies intents by comparing words and phrases in ASR output data or text data to the words and phrases in an intents database. In some embodiments, the NLU component may communicate with multiple intents databases, with each intents database corresponding to one or more intents associated with a particular skill.

For example, IC processing of the natural language input “play my workout playlist” may determine an intent of <PlayMusic>. For further example, IC processing of the natural language input “call mom” may determine an intent of <Call>. In another example, IC processing of the natural language input “call mom using video” may determine an intent of <VideoCall>. In yet another example, IC processing of the natural language input “what is today’s weather” may determine an intent of <OutputWeather>.

The NLU component may also perform named entity recognition (NER) processing on the ASR output data or text data to determine one or more portions, sometimes referred to as slots, of the natural language input that may be needed for post-NLU processing (e.g., processing performed by a skill). For example, NER processing of the natural language input “play [song name]” may determine an entity type of “SongName” and an entity value corresponding to the indicated song name. For further example, NER processing of the natural language input “call mom” may determine an entity type of "Recipient" and an entity value corresponding to "mom." In another example, NER processing of the natural language input "what is today's weather" may determine an entity type of "Date" and an entity value of "today."

In at least some embodiments, the intents identifiable by the NLU component may be linked to one or more grammar frameworks with entity types to be populated with entity values. Each entity type of a grammar framework corresponds to a portion of ASR output data or text data that the NLU component believes corresponds to an entity value. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component may perform NER processing to identify words in ASR output data or text data as subject, object, verb, preposition, etc. based on grammar rules and/or models. Then, the NLU component may perform IC processing using the identified verb to identify an intent. Thereafter, the NLU component may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component may generate NLU output data including one or more NLU hypotheses, with each NLU hypothesis including an intent and optionally one or more entity types and corresponding entity values. In some embodiments, the NLU component may perform IC processing and NER processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 120 may perform speech processing using two different components (e.g., the ASR component 150 and the NLU component). In at least some embodiments, the system 120 may implement a spoken language understanding (SLU) component configured to process audio data 211 to determine NLU output data.

The SLU component may be equivalent to a combination of the ASR component 150 and the NLU component. Yet, the SLU component may process audio data 211 and directly determine the NLU output data, without an intermediate step of generating ASR output data. As such, the SLU component may take audio data 211 representing a spoken natural language input and attempt to make a semantic interpretation of the spoken natural language input. That is, the SLU component may determine a meaning associated with the spoken natural language input and then implement that meaning. For example, the SLU component may interpret audio data 211 representing a spoken natural language input in order to derive a desired action. The SLU component may output a most likely NLU hypothesis, or multiple NLU hypotheses associated with respective confidence or other scores (such as probability scores, etc.).

The system 120 may include one or more skill components 190 and/or may communicate with one or more skill systems 125. A "skill" may refer to software, that may be placed on a machine or a virtual machine (e.g., software that may be launched in a virtual instance when called), configured to process NLU output data and perform one or more actions in response thereto. For example, for NLU output data including a <PlayMusic> intent, an "artist" entity type, and an artist name as an entity value, a music skill may be called to output music sung by the indicated artist. For further example, for NLU output data including a <TurnOn> intent, a "device" entity type, and an entity value of "lights," a smart home skill may be called to cause one or more "smart" lights to operate in an "on" state. In another example, for NLU output data including an <OutputWeather> intent, a "location" entity type, and an entity value corresponding to a geographic location of the device 110, a weather skill may be called to output weather information for the geographic location. For further example, for NLU output data including a <BookRide> intent, a taxi skill may be called to book a requested ride. In another example, for NLU output data including a <BuyPizza> intent, a restaurant skill may be called to place an order for a pizza.

A skill component 190 may operate in conjunction between the system 120 and other devices, such as the device 110, a restaurant electronic ordering system, a taxi electronic booking system, etc. in order to complete certain functions. Inputs to a skill component 190 may come from speech processing interactions or through other interactions or input sources.

A skill component 190 may be associated with a domain, a non-limiting list of which includes a smart home domain, a music domain, a video domain, a weather domain, a communications domain, a flash briefing domain, a shopping domain, and a custom domain.

The system 120 may include a TTS component 180 that generates audio data including synthesized speech. The data input to the TTS component 180 may come from a skill 125, the orchestrator component 130, or another component of the system 120.

In one method of synthesis called unit selection, the TTS component 180 matches input data against a database of recorded speech. The TTS component 180 selects matching units of recorded speech and concatenates the units together to form audio data. In another method of synthesis called parametric synthesis, the TTS component 180 varies parameters such as frequency, volume, and noise to determine audio data including an artificial speech waveform. Parametric synthesis uses a computerized voice generator, sometimes called a vocoder.

The system 120 may include a user recognition component 195. The user recognition component 195 may recognize one or more users using various data. The user recognition component 195 may take as input the audio data 211. The user recognition component 195 may perform user recognition by comparing speech characteristics, in the audio data 211, to stored speech characteristics of users. The user recognition component 195 may additionally or alternatively perform user recognition by comparing biometric data (e.g., fingerprint data, iris data, retina data, etc.), received by the system 120 in correlation with a natural language input, to stored biometric data of users. The user recognition component 195 may additionally or alternatively perform user recognition by comparing image data (e.g., including a representation of at least a feature of a user), received by the system 120 in correlation with a natural language input, with stored image data including representations of features of different users. The user recognition component 195 may perform other or additional user recognition processes, including those known in the art. For a particular natural language input, the user recognition component 195 may perform processing with respect to stored data of users associated with the device 110 that received the natural language input.

The user recognition component 195 determines whether a natural language input originated from a particular user. For example, the user recognition component 195 may determine a first value representing a likelihood that a natural language input originated from a first user, a second value representing a likelihood that the natural language input originated from a second user, etc. The user recognition component 195 may also determine an overall confidence regarding the accuracy of user recognition processing.

The user recognition component 195 may output a single user identifier corresponding to the most likely user that originated the natural language input. Alternatively, the user recognition component 195 may output multiple user identifiers (e.g., in the form of an N-best list) with respective values representing likelihoods of respective users originating the natural language input. The output of the user recognition component 195 may be used to inform NLU processing, processing performed by a skill 125, as well as processing performed by other components of the system 120 and/or other systems.

The system 120 may include profile storage 170. The profile storage 170 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill enablement data; and/or other data.

The profile storage 170 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill identifiers of skills 125 that the user has enabled. When a user enables a skill 125, the user is providing the system 120 with permission to allow the skill 125 to execute with respect to the user's natural language inputs. If a user does not enable a skill 125, the system 120 may not execute the skill 125 with respect to the user's natural language inputs.

The profile storage 170 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 170 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

Figure 2:
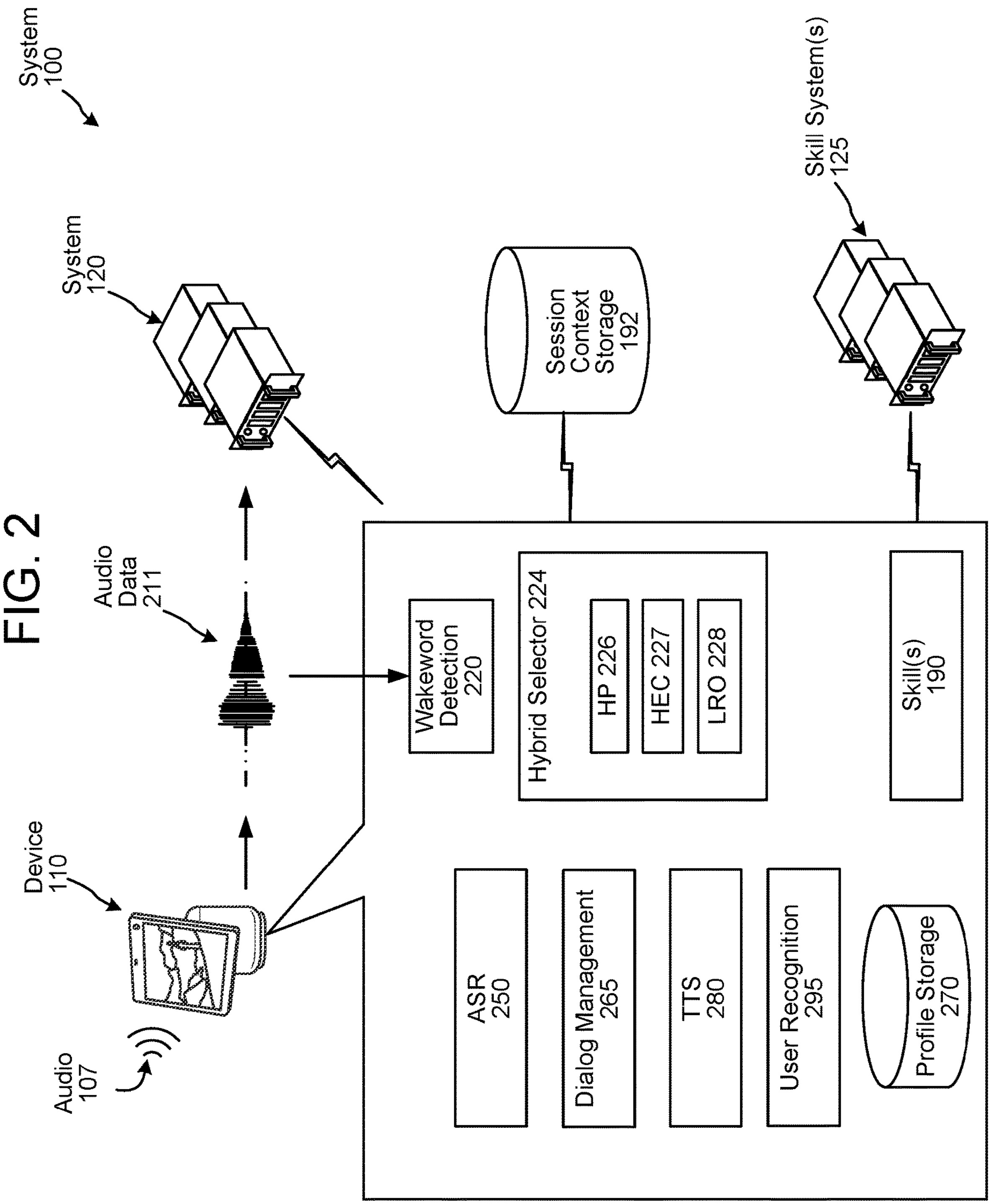
FIG. 2 is a conceptual diagram illustrating components that may be included in a device, according to embodiments of the present disclosure.

The foregoing describes illustrative components and processing of the system 120. The following describes illustrative components and processing of the device 110. As illustrated in FIG. 2, in at least some embodiments the system 120 may receive audio data 211 from the device 110, to recognize speech corresponding to a spoken natural language in the received audio data 211, and to perform functions in response to the recognized speech. In at least some embodiments, these functions involve sending directives (e.g., commands), from the system 120 to the device 110 to cause the device 110 to perform an action, such as output synthesized speech (responsive to the spoken natural language input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., an audio or video call) between the user 105 and another user, and so on.

The device 110 may include a wakeword detection component 220 configured to detect a wakeword (e.g., "Alexa") that indicates to the device 110 that the audio data 211 is to be processed for determining NLU output data. In at least some embodiments, a hybrid selector 224, of the device 110, may send the audio data 211 to the wakeword detection component 220.

If the wakeword detection component 220 detects a wakeword in the audio data 211, the wakeword detection component 220 may send an indication of such detection to the hybrid selector 224. In response to receiving the indication, the hybrid selector 224 may send the audio data 211 to the system 120 and/or an on-device ASR component 250. The wakeword detection component 220 may also send an indication, to the hybrid selector 224, representing a wakeword was not detected. In response to receiving such an indication, the hybrid selector 224 may refrain from sending the audio data 211 to the system 120, and may prevent the on-device ASR component 250 from processing the audio data 211. In this situation, the audio data 211 can be discarded.

The device 110 may conduct its own speech processing using on-device language processing components (such as an on-device SLU component, and/or an on-device ASR component 250) similar to the manner discussed above with respect to the ASR component 150. The device 110 may also internally include, or otherwise have access to, other components such as one or more skills 190, a user recognition component 295 (configured to process in a similar manner to the system-implemented user recognition component 195), profile storage 270 (configured to store similar profile data to the system-implemented profile storage 170), and other components. In at least some embodiments, the on-device profile storage 270 may only store profile data for a user or group of users specifically associated with the device 110. The device 110 may also include a TTS component 280 similar to the TTS component 180 described herein.

The device 110 may also include a dialog management component 265 that may be configured to perform operations similar to the dialog management component 165, and may be personalized for the user 105 of the device 110. The device 110 may be in communication with the session context storage 192.

In at least some embodiments, the on-device language processing components may not have the same capabilities as the language processing components implemented by the system 120. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 224, of the device 110, may include a hybrid proxy (HP) 226 configured to proxy traffic to/from the system 120. For example, the HP 226 may be configured to send messages to/from a hybrid execution controller (HEC) 227 of the hybrid selector 224. For example, command/directive data received from the system 120 can be sent to the HEC 227 using the HP 226. The HP 226 may also be configured to allow the audio data 211 to pass to the system 120 while also receiving (e.g., intercepting) this audio data 211 and sending the audio data 211 to the HEC 227.

In at least some embodiments, the hybrid selector 224 may further include a local request orchestrator (LRO) 228 configured to notify the on-device ASR component 250 about the availability of the audio data 211, and to otherwise initiate the operations of on-device language processing when the audio data 211 becomes available. In general, the hybrid selector 224 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 211 is received, the HP 226 may allow the audio data 211 to pass through to the system 120 and the HP 226 may also input the audio data 211 to the on-device ASR component 250 by routing the audio data 211 through the HEC 227 of the hybrid selector 224, whereby the LRO 228 notifies the on-device ASR component 250 of the audio data 211. At this point, the hybrid selector 224 may wait for response data from either or both the system 120 and/or the on-device language processing components. However, the disclosure is not limited thereto, and in some examples the hybrid selector 224 may send the audio data 211 only to the on-device ASR component 250 without departing from the disclosure. For example, the device 110 may process the audio data 211 on-device without sending the audio data 211 to the system 120.

The on-device ASR component 250 is configured to receive the audio data 211 from the hybrid selector 224, and to recognize speech in the audio data 211, and the on-device NLU component 260 is configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis may be selected as usable to respond to a natural language input, and local response data may be sent (e.g., local NLU output data, local knowledge base information, internet search results, and/or local directive data) to the hybrid selector 224, such as a "ReadyToExecute" response. The hybrid selector 224 may then determine whether to use directive data from the on-device components to respond to the natural language input, to use directive data received from the system 120, assuming a remote response is even received (e.g., when the device 110 is able to access the system 120 over the network(s) 199), or to determine output data requesting additional information from the user 105.

The device 110 and/or the system 120 may associate a unique identifier with each natural language input. The device 110 may include the unique identifier when sending the audio data 211 to the system 120, and the response data from the system 120 may include the unique identifier to identify to which natural language input the response data corresponds.

In at least some embodiments, the device 110 may include one or more skill components 190. The skill component(s) 190 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

One or more of the components described herein may employ a machine learning (ML) model(s). Generally, ML models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognition patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning model requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 3:
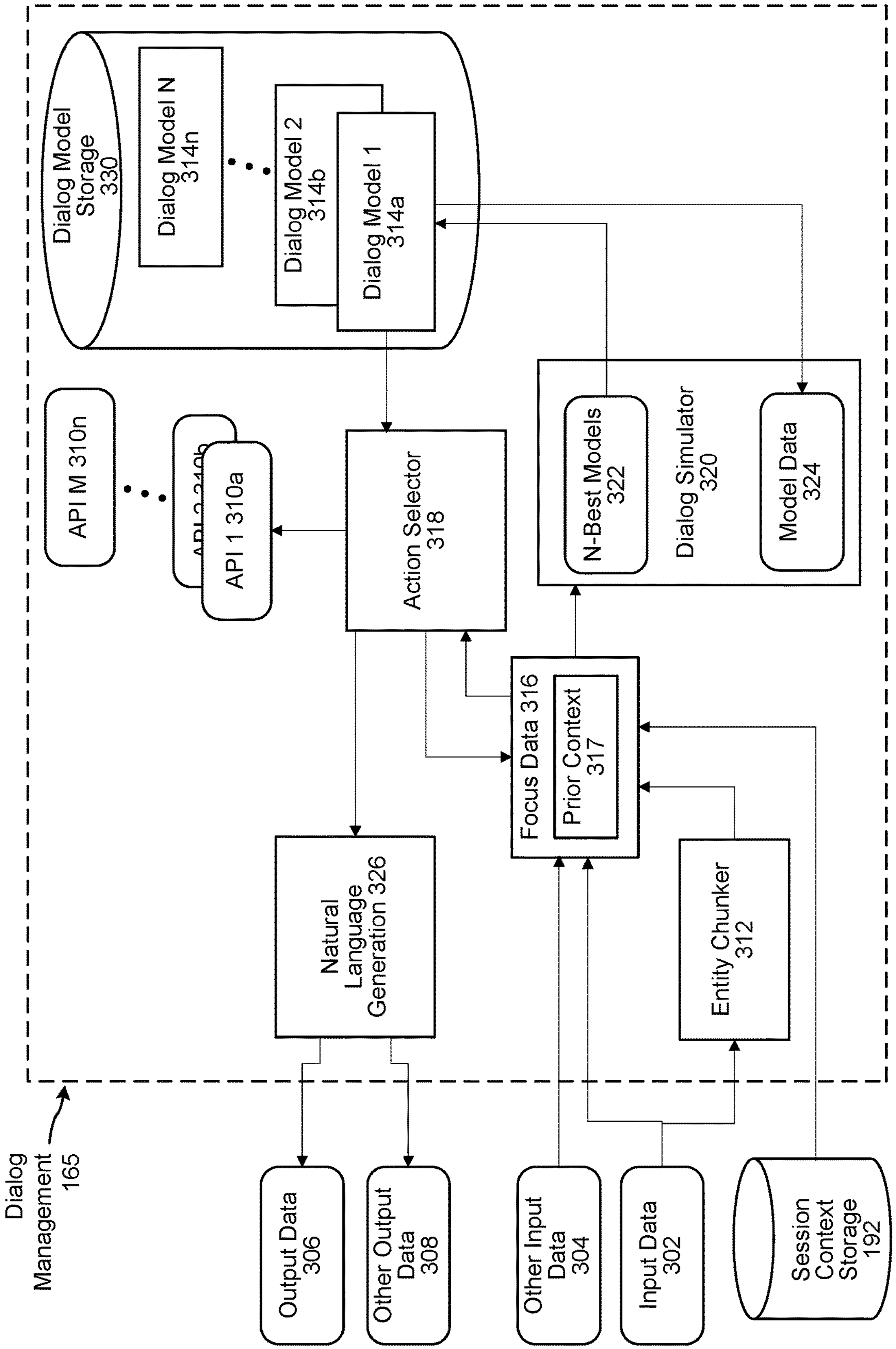
FIG. 3 is a conceptual diagram illustrating a system for managing a goal-oriented dialog using multiple dialog models, according to embodiments of the present disclosure.

FIG. 3 is a conceptual diagram illustrating components of the dialog management component 165, according to embodiments of the present disclosure. The dialog management component 165 may include a dialog simulator component 320 that may determine a system response to a user input based on various data relating to the dialog session.

The dialog management component 165 receives input data 302. The input data 302 may include text data, token data or ASR data (one or more ASR hypotheses, each including text data or token data, and a corresponding confidence score) corresponding to a user input provided by the user 105. The input data 302 may also include data indicating further information about the user input, such as the profile identifier for the user 105, an emotional state of the user, device information for the device 110, etc. The input data 302 may be data representing words, instructions, markup language, speech, or gestures, or may be a vector or other representation of the same. The input data 302 may be generated by a user via a keyboard, touchscreen, microphone, camera, or other such input device. In other embodiments, the input data 302 is created using ASR, as described above, from audio data received from a user.

The dialog management component 165 may also receive other input data 304, which may correspond to a button press, gesture, or other input. As described in greater detail below, using the input data 302 and/or other input data 304, the dialog management component 165 may determine output data 306 and/or other output data 308. The dialog management component 165 may instead or additionally perform an action based on the input data 302 and/or other input data 304, such as calling one or more APIs 310.

In some embodiments, the dialog management component 165 may include an entity chunker 312 that may perform named entity recognition (NER) and entity resolution (ER) processing using the input data 302. In other embodiments, the NLU component may perform the NER and ER processing, and the resulting NLU data may be provided to the focus data component 316. The entity chunker 312 may be used to determine that the input data 302 includes a representation of one or more entities, a process that may include NER processing—i.e., determining that the input data 302 includes the representation—and ER processing—i.e., identifying the specific entity mentioned in the user input, such as associating an identity of a person to the representation determined by NER processing. An entity may be a person, place, thing, idea, and/or goal; example entities include proper names, nicknames, business names, place names, song titles, and skill names.

In some embodiments, a single entity chunker 312 may be used for more than one domain (i.e., a "cross-domain" entity chunker 312). In other embodiments, a different entity chunker 312 may be used for each domain. One or more candidate domains corresponding to the input data 302 may be determined and entity chunkers 312 corresponding to the candidate domains may be used to process the input data 302. A focus data component 316 may store the output entities from each candidate domain and may remove unselected entities when a dialog model 314 is selected.

The dialog management component 165 may also include a focus data component 316 that may store data relating to a dialog session that can be used to determine a system response to a user input. The focus data component 316 may store dialog state data corresponding to dialog history data, action history data, and/or other data. The dialog history data may correspond to one or more user inputs provided by the user 105 during the current dialog session, and one or more system responses generated in response to the user inputs. The dialog history data may be text data, token data, or ASR data for the user inputs, and may be text data or other natural language data for the system responses. The action history data may correspond to one or more actions (as determined by the action selector component 318) performed in response to the user inputs for the current dialog session. The action history data may include an identifier for the API 310 called to perform the action, the data inputted to the API 310, and the data outputted by the API 310. The dialog state data may be stored for each turn of the dialog session and may be identified by a turn number, so that the order in which the user inputs are received and the system responses are generated is known. The dialog state data may also include a skill identifier for the skill component 190 that may be invoked to generate the system response.

The focus data component 316 may store context data retrieved from the session context storage 192. In some embodiments, the context data may be retrieved using an API call to load/retrieve the context data for the profile identifier for the user 105. In some cases, the focus data component 316 may include a prior context component 317 configured to process multiple different context data relating to multiple prior interactions for the profile identifier, and may determine which of these context data to use for the current dialog session, for example, based on a goal of the current dialog session and/or an intent of the current user input. In other cases, the focus data component 316 may provide all the different context data relating to multiple prior interactions to the dialog simulator component 320, and the dialog simulator component 320 may determine which context data to use.

In some embodiments, the prior context component 317 may employ one or more aggregating techniques to aggregate or otherwise combine various information included in the context data for multiple prior interactions. The prior context component 317 may combine the information based on entity types. For example, if one or more of the prior interactions related to a particular brand (e.g., a brand of a TV), the prior context component 317 may determine data indicating the brand (e.g., indicating the user 105 preference for the brand). As another example, if one or more of the prior interactions related to a particular price range/point (e.g., cheap, moderate, expensive, etc.), then the prior context component 317 may determine data indicating the price range/point. Such data—brand information, price range information—may be used by the dialog management component 165 to determine a system response. The prior context component 317 may combine the information in the context data based on action types (e.g., search action, purchase action, restaurant reservation action, etc.).

In some embodiments, the prior context component 317 may employ one or more filtering techniques to filter out certain information included in the context data for multiple prior interactions, where the filtering may be based on the current user input and/or the goal of the current dialog. For example, if the goal of the current dialog is to search for a TV, then the prior context component 317 may filter out information in the context data relating to a coffee machine or other item that is not related to a TV. As another example, the prior context component 317 may determine information in the context data that relates to a TV, such as, brand preference information (even from a prior interaction that is not related to a TV but may be related to another appliance), price range information, etc. As another example, if the goal of the current dialog is to book a taxi, then the prior context component 317 may determine information in the context data relating to locations (e.g., a prior interaction may relate to reserving a restaurant at a particular location, a prior interaction may relate to booking a flight departing from a particular location, etc.).

The prior context component 317 (or another component of the dialog management component 165) may determine which context data to use based on a timestamp associated with the context data, where the timestamp may indicate a time when the context data is stored or a time for when the prior interaction occurred. For example, if the prior context component 317 determines that location information is useful or needed to perform an action in the current dialog, then the prior context component 317 may use location information with the most recent timestamp.

The prior context component 317 may aggregate, filter, and perform other actions with respect to context data from multiple prior interactions of the user 105. These actions may be based on entity types, action types, intent types, goal types, topic types, etc.

In some embodiments, the prior context component 317 may use one or more machine learning models to determine which context data to use for the current dialog.

In some embodiments, certain functionalities of the prior context component 317 may be performed by another system (not shown) which may be configured to manage the session context storage 192. This other system may receive context data, for various interactions associated with the user 105/profile identifier, from various systems (e.g., the system 120, the system 121, and others). This other system may relate to a particular domain/functionality (e.g., a shopping domain, a music domain, etc.). This other system may aggregate, filter, and perform other actions (in a similar manner as described with respect to the prior context component 317) with respect to the context data relating to the multiple different prior interactions. In such embodiments, the prior context component 317 may receive aggregated, filtered or other type of processed context data from the session context storage 192.

In a non-limiting example, a user input for a current dialog may involve searching for a TV accessory (e.g., cables, TV wall mount, or the like), and the prior context component 317 may determine to not use context data from a prior interaction involving searching for a TV as a new purchase. Instead, if available, the prior context component 317 may determine to use context data from a prior interaction in which a TV was purchased, based on determining that the user 105 may be searching for TV accessories for the purchased TV (and not for a TV that the user was searching for but did not purchase yet).

In some embodiments, if the dialog management component 165 cannot determine which context data to use for the current dialog, then the dialog management component 165 may confirm with the user 105 (using a NLG response) which context data to use (e.g., "do you want TV accessories for the [first brand] TV or [second brand] TV", where the [first brand] and [second brand] may be derived the context data for one or more prior interactions).

In some embodiments, the focus data component 316 may retrieve the context data from the session context storage 192 only at the start of the dialog session (i.e. when the first user input for the dialog session is received), and may simply update the dialog state data (e.g., dialog history data, action history data, and/or other data stored by the focus data component 316 for the present dialog session) after each turn of the dialog session. For example, the dialog history data may be updated to include the user input and the system response for the turn that just occurred.

In some embodiments, the other components (e.g., the dialog simulator component 320 and/or the action selector component 318) may query the focus data component 316 for the dialog state data. The focus data component 316 may receive additional data from other components and systems. In some embodiments, the focus data component 316 may include an encoder to determine encoded dialog state data, which may correspond to features extracted from the dialog state data. In other embodiments, the dialog simulator component 320 and/or the action selector component 318 may include the encoder to determine encoded dialog state data.

The focus data component 316 may store graph-based dialog state data including a plurality of graph nodes; each graph node may correspond to an item of dialog state data, such as an entity type, entity value, prior API call, and/or user data. The other components, such as the dialog simulator component 320 and/or the action selector component 318, may access all of the graph nodes or may access only a subset of the graph nodes. The focus data component 316 may use any type of storage mechanism and may serve as long-term and/or short term memory for the dialog management component 165, thus enabling tracking of entities, ASR data, TTS output, and other features at each turn of a dialog. In some embodiments, the focus data component 316 may be updated after each turn of dialog with updated dialog state data.

The entity chunker 312 may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain skills 190 (e.g., a shopping skill, a music skill, a video skill, etc.), or may be organized in a variety of other ways.

For example, the entity chunker 312 may parse the input data 302 to identify words as subject, object, verb, preposition, etc. based on grammar rules and/or models prior to recognizing named entities in the text data. The entity chunker 312 may perform semantic tagging, which is the labeling of a word or combination of words according to their type/semantic meaning. The entity chunker 312 may parse text data using heuristic grammar rules, or a model may be constructed using techniques such as Hidden Markov Models, maximum entropy models, log linear models, conditional random fields (CRF), and the like. For example, an entity chunker 312 corresponding to a music skill may parse and tag text data corresponding to "play mother's little helper by the rolling stones" as {Verb}: "Play," {Object}: "mother's little helper," {Object Preposition}: "by," and {Object Modifier}: "the rolling stones." The entity chunker 312 identifies "Play" as a verb based on a word database associated with the music skill and may determine that the verb corresponds to a <PlayMusic> intent.

The entity chunker 312 may tag text data to attribute meaning thereto. For example, the entity chunker 312 may tag "play mother's little helper by the rolling stones" as: {skill} Music, {intent}<PlayMusic>, {artist name} rolling stones, {media type} SONG, and {song title} mother's little helper. For further example, the entity chunker 312 may tag "play songs by the rolling stones" as: {skill} Music, {intent}<PlayMusic>, {artist name} rolling stones, and {media type} SONG.

The entity chunker 312 may apply rules or other instructions to transform labels or tokens into a standard representation. The transformation may depend on the skill component 190. For example, for a travel skill, the entity chunker 312 may transform text data corresponding to "Boston airport" to the standard BOS three-letter code referring to the airport. The entity chunker 312 can refer to an entity storage(s) (including text data representing entities known to the system) to resolve the precise entity referred to in each slot of each NLU hypothesis represented in the cross-skill N-best list data. Specific intent/slot combinations may also be tied to a particular source, which may then be used to resolve the text data. In the example "play songs by the stones," the entity chunker 312 may reference a personal music catalog, Amazon Music account, user profile data, or the like. The entity chunker 312 may output text data including entity IDs corresponding to specific entities mentioned in the user input and that can eventually be used by a skill 190. The entity chunker 312 may include multiple entity resolution components and each entity resolution component may be associated with one or more particular skills 190 and/or domains.

The entity chunker 312 may use frameworks, linked to intents, to determine what database fields should be searched to determine the meaning of tagged entities, such as searching a user's gazetteer for similarity with the framework slots. For example, a framework for a <PlayMusic> intent might indicate to attempt to resolve an identified object based on {Artist Name}, {Album Name}, and {Song name}, and another framework for the same intent might indicate to attempt to resolve an object modifier based on {Artist Name}, and resolve the object based on {Album Name} and {Song Name} linked to an identified {Artist Name}. If the search of the gazetteer does not resolve a slot/field using gazetteer information, the entity chunker 312 may search a database of generic words associated with the skill component 190. For example, if the text data includes "play songs by the rolling stones," after failing to determine an album name or song name called "songs" by "the rolling stones," the entity chunker 312 may search the skill vocabulary for the word "songs." In the alternative, generic words may be checked before the gazetteer information, or both may be tried, potentially producing two different results.

The entity chunker 312 may include a ranker component. The ranker component may assign a particular confidence score to each NLU hypothesis input therein. The confidence score of a NLU hypothesis may represent a confidence of the entity chunker 312 in the processing performed with respect to the NLU hypothesis. The confidence score of a particular NLU hypothesis may be affected by whether the NLU hypothesis has unfilled slots. For example, if a NLU hypothesis associated with a first skill component includes slots that are all filled/resolved, that NLU hypothesis may be assigned a higher confidence score than another NLU hypothesis including at least some slots that are unfilled/unresolved by the entity chunker 312.

The focus data component 316 may store data relevant to a dialog. In various embodiments, the focus data component 316 stores the input data 302, other input data 304, entity data from the entity chunker 312, action data, and/or dialog data from an action selector component 318 (described in greater detail below). The focus data component 316 may further store additional information, such as location data, user preference data, and environment data. In various embodiments, the focus data component 316 uses an encoder to encode some or all of the received data into one or more feature vectors and a decoder to determine, based on the feature vectors, intent data corresponding to an intent of a user.

The dialog simulator component 320 is configured to select one or more dialog models 314, from a dialog model storage 330, for further processing of the input data 302. Each dialog model 314 may be associated with one or more categories of functions. The dialog simulator component 320 may be a trained model, such as a classifier. In various embodiments, the dialog simulator component 320 generates an N-best list of models 322 including two or more of the dialog models 314 for further processing. The dialog simulator component 320 may create the N-best list 322 by determining a score for each dialog model 314 given the data stored at the focus data component 316 and model data 324. The model data 324 may include a type of each dialog model 314 and APIs and corresponding entities for each dialog model 314. The dialog simulator component 320 may, for example, determine the score based on a presence or absence of one or more entities determined by the entity chunker 312 in the model data 324. Presence of an entity in a list of entities corresponding to a dialog model 314 may, for example, result in a higher score for the dialog model 314. The dialog simulator component 320 may send the input data 302 to the dialog models 314 having the N highest scores. In other embodiments, the dialog simulator component 320 sends the input data 302 to the dialog models 314 having scores greater than a threshold. The threshold may be a numerical value or the number N of dialog models 314 to be selected. For at least the first turn of a dialog, the dialog simulator component 320 may use the context data from the session context storage 192 to select the dialog model(s) 314.

A dialog model 314 may be generated by the dialog simulator component 320 by generalizing annotated dialogs, which may be provided by a skill developer, to cover various ways a user may interact with a skill. For example, a user may say variations of utterances to invoke specific functionality, provide requested information out of order, or change previously provided information. The dialog simulator component 320 may generate data, for the dialog model 314, by expanding the annotated dialogs including entity types, API definitions, utterance sets, and system responses into tens of thousands of dialog variants, phrasing variations, and uncommon alternatives to create a wider range of possible dialog paths. As such, as dialog model 314 may include data representing a flow of a dialog based on sample user inputs, entity types, API calls, system responses, etc.

In some embodiments, the dialog models 314 may include a dialog model(s) that is to be used when context data from a prior session is available. Such dialog model(s) may be indicated as such, and may be prioritized by the dialog simulator component 320 when context data for a prior session is retrieved by the focus data component 316 from the session context storage 192.

The selected dialog model(s) 314 may process the input data 302. In some embodiments, the dialog model(s) 314 also receive the other input data 304 and/or data from the focus data component 316. Each dialog model 314 may be a trained model, such as a sequence-to-sequence model, an encoder-decoder model, a neural network, etc., and may be trained using goal-oriented dialog training data. The training data may include dialog data between a user and a system and may include API call information related to goals expressed by the user.

Each of the selected dialog models 314 generates response data based on the input data 302. The response data may include output text data, which may correspond to a prompt for more information (e.g., additional entity information). The response data may further include API call data and corresponding entities (arguments/inputs for the API call).

The action selector component 318 is configured to select at least one of the outputs of the dialog model(s) 314 for further processing. Each output may be associated with a corresponding category of function(s). The action selector component 318 may be a trained model, such as a classifier, and may determine a score for each of the outputs of the dialog models 314 based on each's similarity or relevance to the data from the focus data component 316, based on user preference data, and/or based on the input data 302. For at least the first turn of a dialog, the action selector component 318 may use the context data from the session context storage 192. The output of the dialog model 314 corresponding to the highest score is selected; if the output is an API call, one or more APIs 310 may be activated and a corresponding action carried out. If, however, the output is a prompt or other output data, a natural language generator (NLG) component 326 may be used to generate the output data 306 (which may be text data) and/or other output data 308 based on the output of the dialog model 314. In either case, the selected action may be used to update the dialog state data at the focus data component 316.

Figure 4:
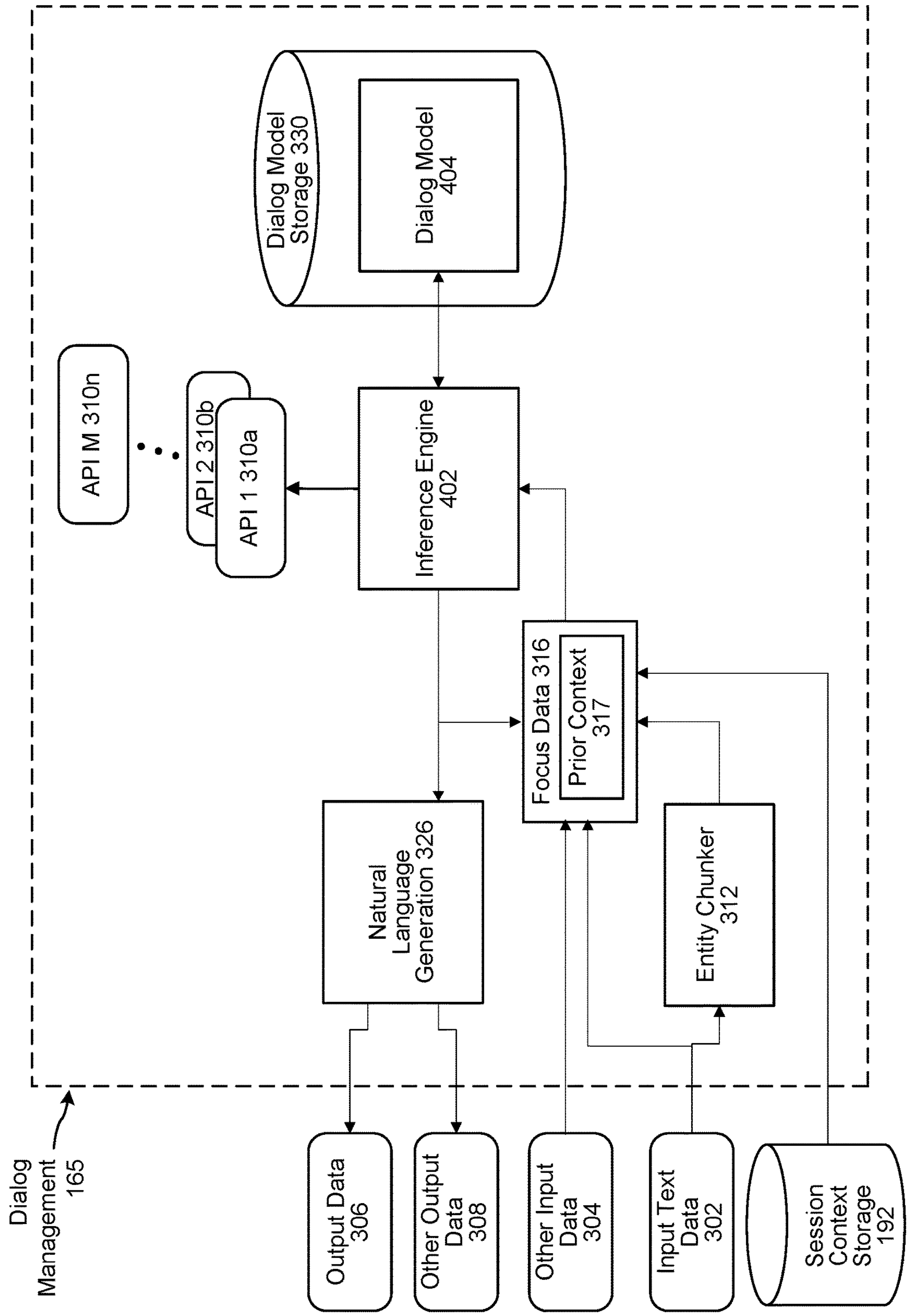
FIG. 4 is a conceptual diagram illustrating a system for managing between states using a dialog model, according to embodiments of the present disclosure.

FIG. 4 illustrates another embodiment of the dialog management component 165, according to the present disclosure. In such embodiments, the dialog management component 165 may include an inference engine 402 instead of the action selector component 318 and the dialog simulator component 320. The inference engine 402 is used to generate scores for one or more outputs of a single dialog model 404. The inference engine 402 may be a trained model, such as a classifier, and the scores may correspond to a similarity or correlation between outputs of the dialog model 404 to the dialog state data stored at the focus data component 316. The inference engine 402 may select one or more outputs having the highest score(s) and call a corresponding API 310 and/or send the output to the NLG component 326. In some embodiments, the inference engine 402 may be configured to perform the functionalities of the dialog simulator component 320 and the action selector component 318. In some embodiments, the inference engine 402 includes a dynamic computation graph for reading data from the focus data component 316.

Figure 5:
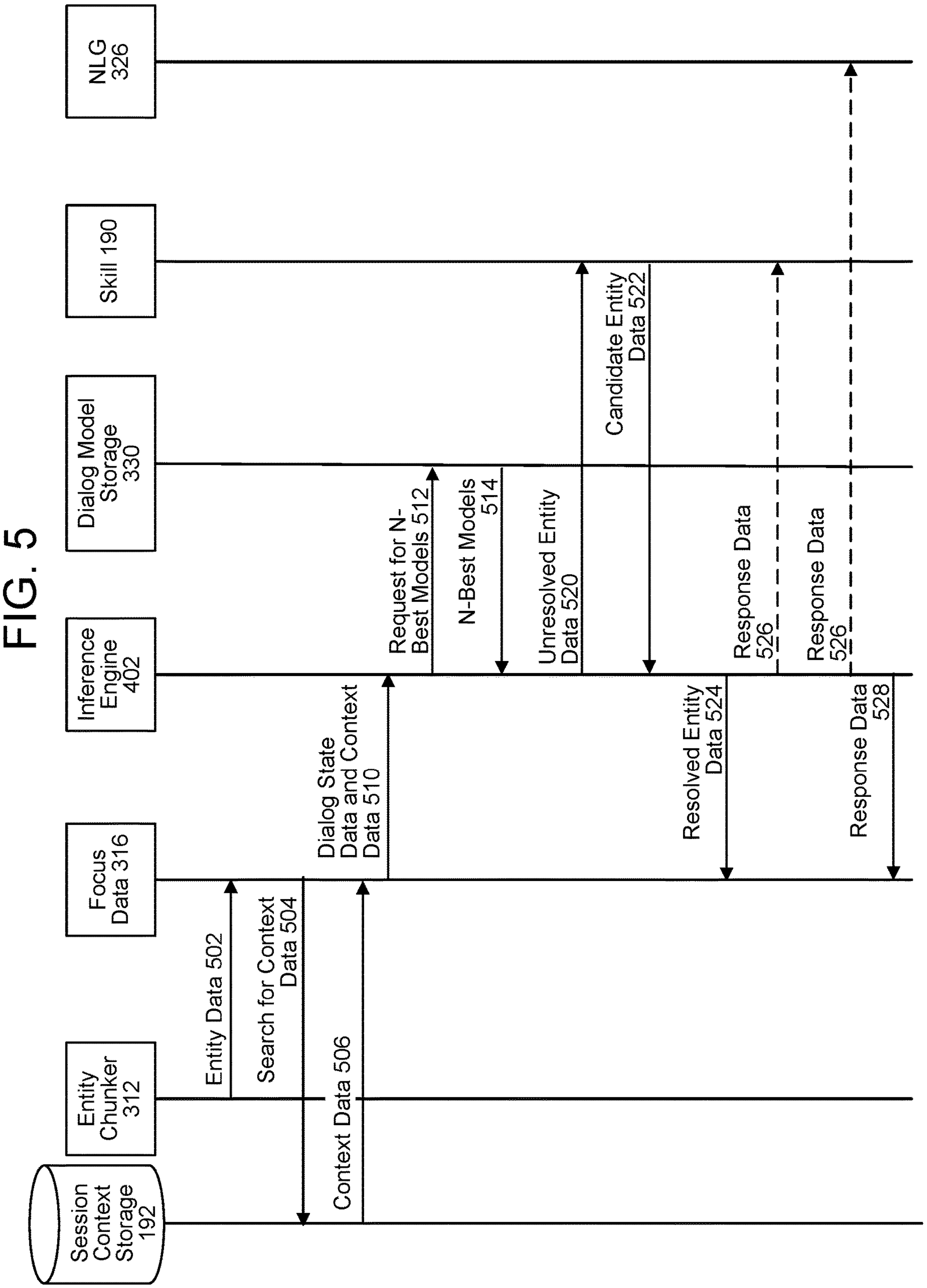
FIG. 5 is a signal flow diagram for managing a goal-oriented dialog using multiple dialog models, according to embodiments of the present disclosure.

FIG. 5 is a signal flow diagram for managing a goal-oriented dialog using multiple dialog models, according to embodiments of the present disclosure. The entity chunker 312 sends (502) entity data for a user input to the focus data component 316, which may update the dialog state data, for the current dialog session, to include the entity data. The focus data component 316 may separately receive the input data 302 corresponding to the user input, and may update the dialog state data to include the input data 302. Based on the input data 302, including the profile identifier, the focus data component 316 may search (504) for context data in the session context storage 192. The focus data component 316 may search for context data relevant for the current dialog, for example, based on entities included in the first user input. The focus data component 316 may search the session context storage 192 for only the first user input of the current dialog session. The session context storage 192 may send (506) one or more context data that matches the search criteria provided by the focus data component 316. In some embodiments, the focus data component 316 may determine to use one of the retrieved context data for the current dialog session based on determining that the current dialog session is a continuation of a previous session (e.g., a previous dialog session with the system 120, a previous session with the system 121, etc.). The focus data component 316 may determine to use some or all information included in retrieved context data based on entities included in the first user input. During subsequent user inputs for the current dialog, the focus data component 316 may use some information in the context data based on the action (API or skill to be called, NLG response to be outputted) to be performed and what type of data is needed to perform that action (e.g., to populate the arguments of the API call, populate the NLG template, etc.).

The focus data component 316 may send (510) dialog state data, for the current dialog session, and the context data, from the session context storage 192, to the inference engine 402, where the dialog state data may include the input data 302, the other input data 304, the entity data from the entity chunker 312, and dialog history data. Based on this data, the inference engine 402 may send (512) a request for N-best models to the dialog model storage 330. As described herein, the N-best list may include one or more dialog models that correspond to the dialog state data and the context data. The dialog model storage 330 returns (514), to the inference engine 402, the N-best models. In some cases, the inference engine 402 may send, to the focus data component 316, a request for additional focus data. This request may be based at least in part on the data needed to execute one or more of the N-best models. Alternatively or additionally, this request may be to obtain data to help in selecting one of the dialog models from the N-best models.

The inference engine 402 may resolve the entities for the user input using the data from the dialog state data and the context data. If there are any unresolved entities, the inference engine 402 may send (520), to the skill component 190, unresolved entity data. The skill component 190 may process the unresolved entity data and, using the techniques described herein, return (522) candidate entity data, including one or more candidate entities, to the inference engine 402. The skill component 190 may be, for example, a communication skill, and may include a database of contact information for a user account and may resolve an ambiguous name in the unresolved entity data by, for example, resolving names in the contact information. The inference engine 402 may send (524) resolved entity data to the focus data component 316 for updating the dialog state data for the current dialog session. The inference engine 402 may determine response data based at least in part on one of a plurality of candidate responses determined by the dialog model storage 330 and may send (526) the response data to the skill component 190 or the NLG component 326. The inference engine 402 may also send (528) the response data to the focus data component 316 for updating the dialog state data for the current dialog session.

The response data sent to the skill component 190 may include an API call. The skill component 190 may request, if needed, additional data from the inference engine 402 to execute the API call. The inference engine 402 in turn may request the additional data from the focus data component 316.

The response data sent to the NLG component 326 may include data that the NLG component 326 can use to generate text or other data representing a natural language output. For example, the response data may include one or more nouns, one or more verbs, one or more objects, one or more subjects, and/or other parts of a sentence that the NLG component 326 can use to generate one or more natural language sentences.

The NLG component 326 may be a trained model, such as a neural network, and may generate output data 306 using the response data from the inference engine 402. The output data 306 may have a natural feel and, in some embodiments, includes words and/or phrases specifically formatted for the user 105. As opposed to using templates to formulate responses, the NLG component 326 may include ML models trained from the various templates for forming the output data 306. For example, the NLG component 326 may analyze transcripts of local news programs, television shows, sporting events, or any other media program to obtain common components of a relevant language and/or region. As one illustrative example, the NLG component 326 may analyze a transcription of a regional sports program to determine commonly used words and/or phrases for describing scores and/or other sporting news for a particular region. The NLG component 326 may further receive, as input, data from the focus data component 316, such as the dialog history and the input data 304. The NLG component 326 may also receive other data that can be used to determine a structure for the output data 306, such as a level of formality in the dialog session (e.g., formal, informal, casual, etc.).

The NLG component 326 may generate output data 306 based on one or more response templates. For example, the NLG component 326 may select a template in response to the question, "What is the weather currently like?" of the form: "The weather currently is $weather_information$." The NLG component 326 may analyze the logical form of the template to produce one or more natural language responses including markups and annotations to familiarize the response that is generated. In some embodiments, the NLG component 326 may determine which response is the most appropriate response to be selected. The selection may be based on past system responses of the present dialog session, past user inputs of the present dialog session, a level of formality of the present dialog session, and/or other data. Synthesized speech may be generated by processing the output data 306 using the TTS component 180.

After the current dialog has ended or before that, the focus data component 316 (or another component of the dialog management component 165) may store context data for the current dialog at the session context storage 192. In some embodiments, the prior context component 317 may determine what kind of information is to be stored as the context data for the current dialog. The context data for the current dialog may include the profile identifier for the user 105, one or more actions performed during the dialog (e.g., APIs called, NLG responses, etc.), data that is used to determine the system responses (e.g., API arguments/inputs, entity types, etc.), and other data that may be outputted to the user 105 (e.g., search results, booking confirmation number, etc.). The type of information stored in the context data may be predefined based on the dialog goal (e.g., by a skill developer).

Figure 6:
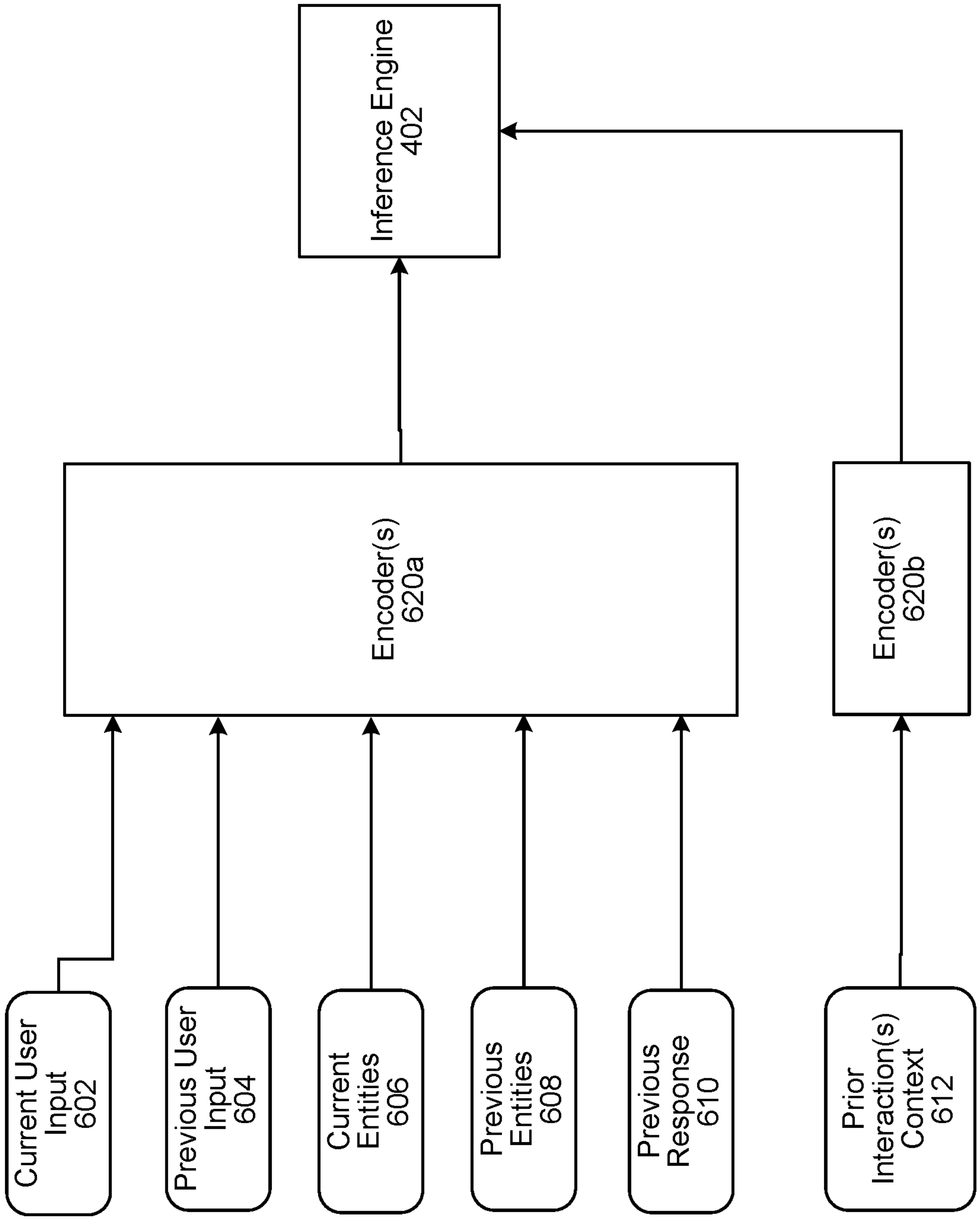
FIG. 6 is a conceptual diagram illustrating data that may be processed by a dialog management component to determine a system response, according to embodiments of the present disclosure.

FIG. 6 conceptually illustrates the types of data that may be processed by the inference engine 402. In some embodiments, different types of data may be inputted into a single encoder 620. In other embodiments, each type of data may be inputted into a separate different encoder 620. The output of the encoder(s) 620 (e.g., encoded data) may be inputted to the inference engine 402 for processing.

In example embodiments, the encoder(s) 620 may take as input a word sequence of L length, and project the word sequence to an F-dimensional vector, where F may be a configurable length. The encoder(s) 620 may output vectors of the same length regardless of the length of input word sequence. The output vector of the encoder(s) 620 may also be referred to as an embedding or a word embedding. The encoder(s) 620 may be a recurrent neural network, LSTM, or other type of ML model.

The encoder(s) 620*a* may process current user input data 602, previous user input data 604, current entities data 606, previous entities data 608, and previous response data 610. The foregoing data processed by the encoder(s) 620*a* may be updated for each turn of the dialog. The encoder(s) 620*b* may process prior interaction(s) context data 612, which may be retrieved/determined at the start of the dialog, and may not be updated after each turn of the dialog. The prior interaction(s) context data 612 may relate to one or more prior interactions between the user 105 and the systems 120 and/or the systems 121, and may be retrieved from the session context storage 192.

One type of data that the inference engine 402 may process is current user input data 602, which may correspond to a user input of the current turn of the dialog session. Another type of data that the inference engine 402 may process is previous user input data 604, which may correspond to one or more user inputs of previous turns of the dialog session (i.e. turns that took place before the current turn of the dialog session). The current user input data 602 and the previous user input data 604 may be text data, token data, or ASR hypotheses corresponding to the user input. The previous user input data 604 may be a matrix, where each row (or column) may correspond to a different previous turn of the dialog session.

The inference engine 402 may also process current entities data 606, which may correspond to one or more entities included in the user input of the current turn. The inference engine 402 may also process previous entities data 608, which may correspond to one or more entities included in the user inputs of the previous turns. The current entities data 606 and the previous entities data 608 may also include an entity type corresponding to each of the entities. The previous entities data 608 may also include a turn identifier to identify which turn of the dialog session the entities correspond to.

Another type of data that the inference engine 402 may process is previous response data 610, which may correspond to one or more system responses in the previous turns of the dialog session. The previous response data 610 may be text data corresponding to a natural language output presented by the system in response to a user input. The previous response data 610 may additionally or alternatively be data representing an API call, inputs used for the API call, and/or the output of the API call. The previous response data 610 may be a matrix where each row (or column) may correspond to a different previous turn of the dialog session.

The inference engine 402 may also process context data 612, which may be retrieved from the session context storage 192 and may correspond to another session (e.g., dialog session or other type of interaction session) involving the user 105, who is engaged in the current dialog session. The context data 612 may include data representing an intent or goal of the other session, one or more entities included in the user inputs of the other session, and/or one or more actions performed by a system during the other session (e.g., API calls, inputs and outputs of the API call).

In some embodiments, the context data 612 may be retrieved for the first user input of the current dialog session. The context data 612 may be processed by the inference engine 402 using a separate attention mechanism than the other types of data 602, 604, 606, 608 and 610. The inference engine 402 may determine if any arguments/inputs for an API call or a natural language output can be determined using the information included in the context data 612. For example, if the goal of the current dialog session is to search for a TV, and the other session corresponding to the context data 612 (which was also a search for a TV) already includes certain search criteria (e.g., [size], [brand], [price range]), then the inference engine 402 may use this information to determine a system response to the current (first) user input.

Figure 7:
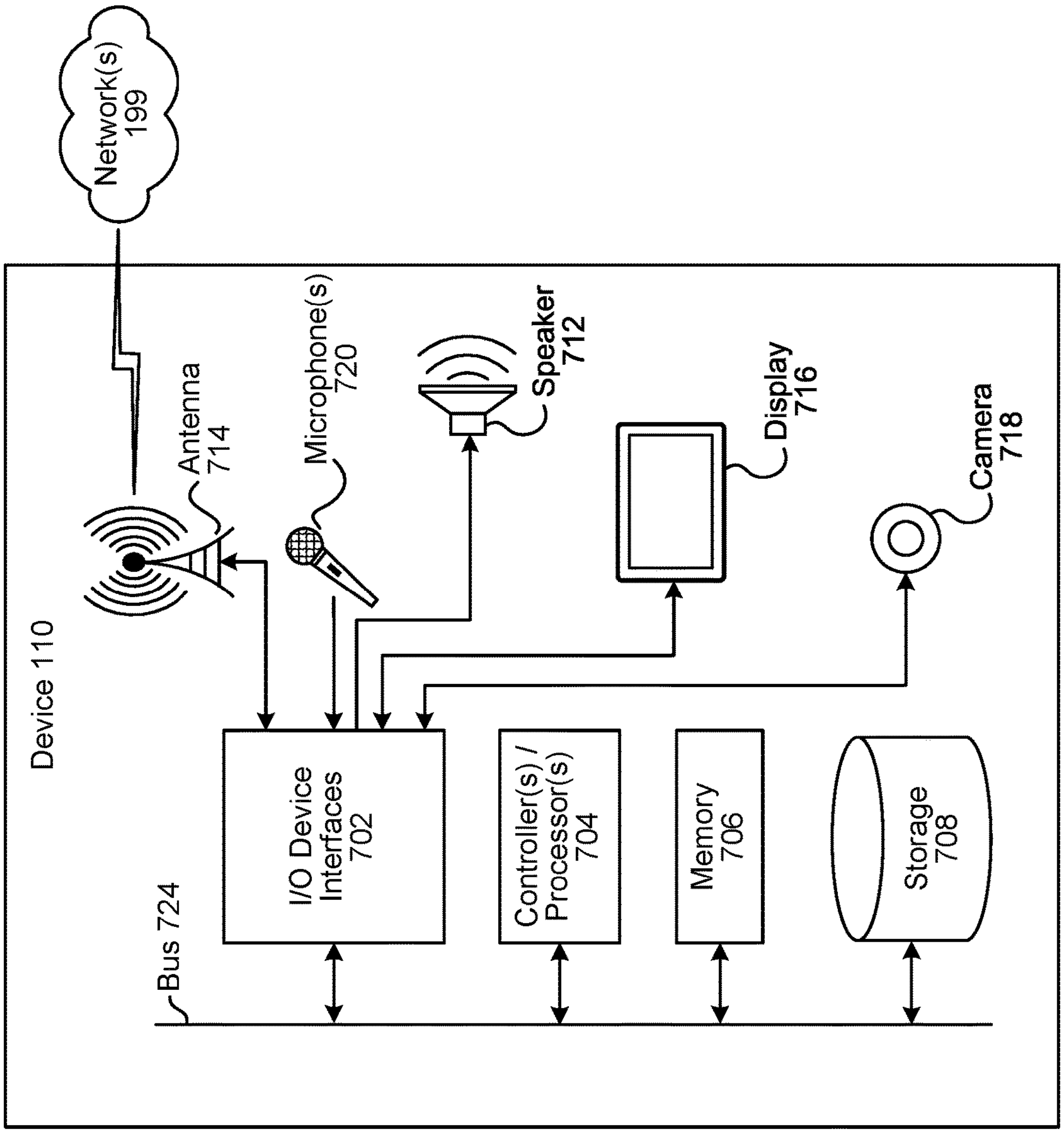
FIG. 7 is a block diagram conceptually illustrating example components of a device, according to embodiments of the present disclosure.
Figure 8:
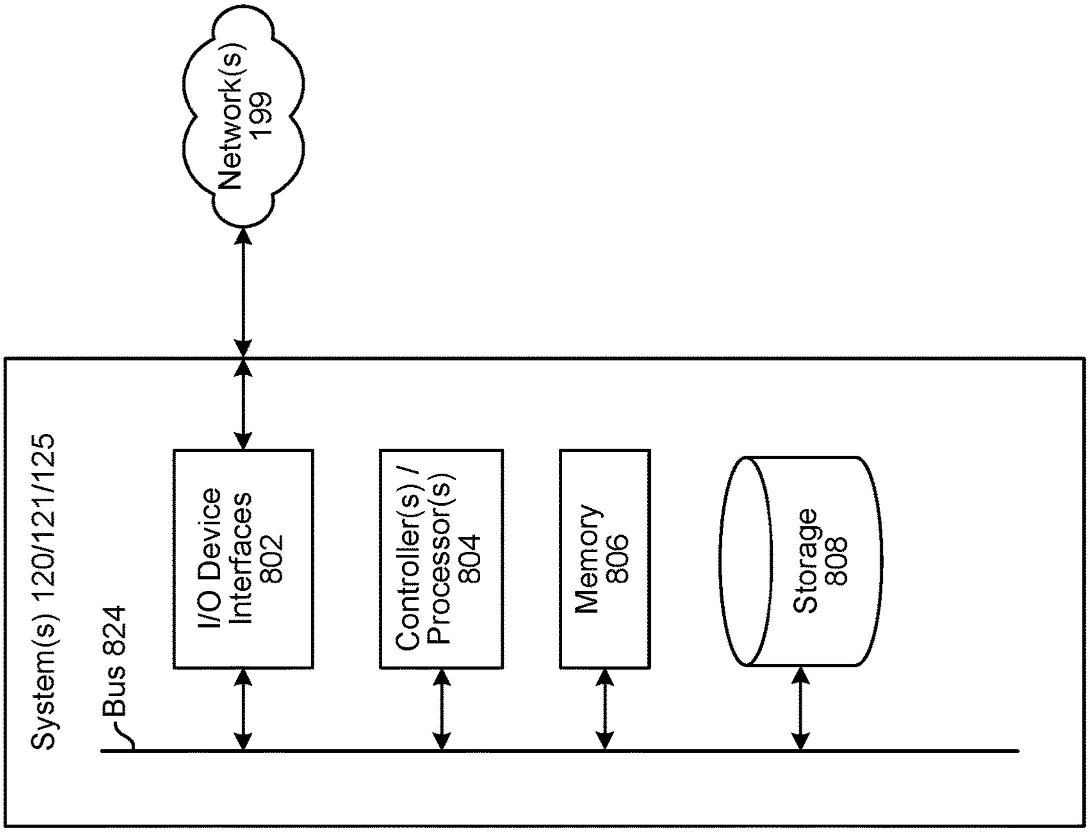
FIG. 8 is a block diagram conceptually illustrating example components of a system, according to embodiments of the present disclosure.

FIG. 7 is a block diagram conceptually illustrating a device 110 of the system 100. FIG. 8 is a block diagram conceptually illustrating example components of a system, such as the system 120, the system 121, and the skill(s) system 125. A system (120/121/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/121/125) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/121/125) may be included in the system 100 of the present disclosure, such as, one or more systems 120 and/or one or more skills 125. In operation, each of these systems may include computer-readable and computer-executable instructions that reside on the respective device (120/121/125), as will be discussed further below.

Each of these devices (110/120/121/125) may include one or more controllers/processors (704/804), which may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive memory (MRAM), and/or other types of memory. Each device (110/120/121/125) may also include a data storage component (708/808) for storing data and controller/processor-executable instructions. Each data storage component (708/808) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (702/802).

Computer instructions for operating each device (110/120/121/125) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120/121/125) includes input/output device interfaces (702/802). A variety of components may be connected through the input/output device interfaces (702/802), as will be discussed further below. Additionally, each device (110/120/125) may include an address/data bus (724/824) for conveying data among components of the respective device. Each component within a device (110/120/121/125) may also be directly connected to other components in addition to (or instead of) being connected to other components across the bus (724/824).

Referring to FIG. 7, the device 110 may include input/output device interfaces 702 that connect to a variety of components such as an audio output component such as a speaker 712, a wired headset or a wireless headset (not illustrated), or other component capable of outputting audio. The device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 716 for displaying content. The device 110 may further include a camera 718.

Via antenna(s) 714, the input/output device interfaces 702 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the device 110, the system 120, the system 121 and/or skill 125 may include their own dedicated processors, memory, and/or storage. Alternatively, one or more of the components of the device 110, the system 120, the system 121 and/or skill 125 may utilize the I/O interfaces (702/802), processor(s) (704/804), memory (706/806), and/or storage (708/808) of the device 110, the system 120, the system 121 and/or skill 125, respectively.

As noted above, multiple devices may be employed in a single system. In such a multi-device system, each of the devices may include different components for performing different aspects of the system's processing. The multiple devices may include overlapping components. The components of the device 110, the system 120, the system 121, and the skill system 125, as described herein, are illustrative, and may be located as a stand-alone device or may be included, in whole or in part, as a component of a larger device or system.

Figure 9:
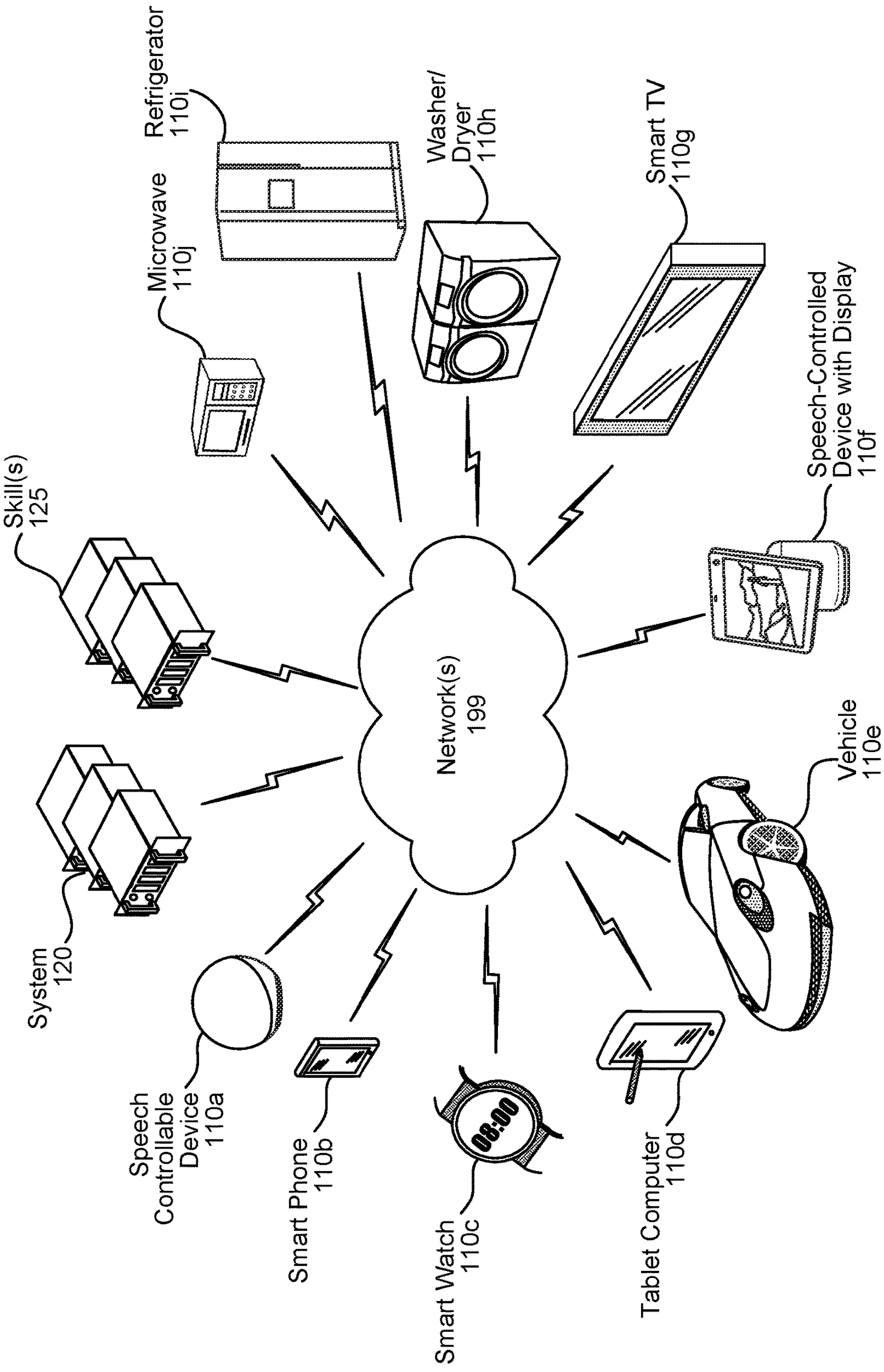
FIG. 9 illustrates an example of a computer network for use with the overall system, according to embodiments of the present disclosure.

As illustrated in FIG. 9, multiple devices (**110*a*-110*j*, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110*a*, a smart phone 110*b*, a smart watch 110*c*, a tablet computer 110*d*, a vehicle 110*e*, a speech-controllable display device 110*f*, a smart television 110*g*, a washer/dryer 110*h*, a refrigerator 110*i*, and/or a microwave 110*j* may be connected to the network(s) 199 through a wireless service provider, over a Wi-Fi or cellular network connection, or the like. Other devices are included as network-connected support devices, such as the system 120, the skill 125, and/or others. The support devices may connect to the network(s) 199** through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:

receiving first input data representing a first natural language input corresponding to a first dialog, the first dialog associated with a profile identifier;

processing, using a first machine learning component, the first input data to determine first output data responsive to the first natural language input;

determining first context data corresponding to the first dialog, the first context data including first entity data;

determining that the first dialog ended before completion of a goal associated with the first dialog;

based on determining that the first dialog ended before completion of the goal, storing the first context data in a manner associated with the profile identifier;

receiving second input data representing a second natural language input different than the first natural language input, the second input data associated with the profile identifier;

determining second entity data corresponding to the second input data;

determining, based on the second input data being associated with the profile identifier and based on the second entity data corresponding to the first entity data, the second input data corresponds to the first dialog;

selecting a second machine learning component for processing the second input data; and based on the second input data being associated with the profile identifier and corresponding to the first dialog, processing, using the second machine learning component, the second input data and the first context data to determine second output data responsive to the second natural language input.

2. The computer-implemented method of claim 1, wherein:

the first machine learning component is associated with a first category of functions; and the second machine learning component associated with a second category of functions.

3. The computer-implemented method of claim 1, further comprising:

processing the first output data to execute a first action; and processing the second output data to execute a second action different from the first action.

4. The computer-implemented method of claim 1, further comprising:

processing the second output data to perform a shopping operation.

5. The computer-implemented method of claim 1, wherein the second natural language input corresponds to a second dialog different from the first dialog.

6. The computer-implemented method of claim 1, further comprising, prior to receiving the second input data:

storing the first context data in a manner associated with a first identifier corresponding to a device that received the first input data.

7. The computer-implemented method of claim 1, wherein:

processing, using the first machine learning component, the first input data comprises performing natural language processing; and processing, using the second machine learning component, the second input data and the first context data comprises performing natural language processing.

8. The computer-implemented method of claim 1, wherein:

the first natural language input was received by a first device; and the second natural language input was received by a second device.

9. The computer-implemented method of claim 1, further comprising:

based on the second entity data corresponding to the first entity data, selecting the first context data, from a data storage including the first context data and second context data, for processing the second input data.

10. The computer-implemented method of claim 1, wherein the processing, using the second machine learning component, the second input data and the first context data comprises:

using at least a portion of the first context data to perform an action responsive to the second input data; and determining the second output data based on performance of the action.

11. A system comprising:

at least one processor; and at least one memory comprising instructions that, when executed by the at least one processor, cause the system to:

receive first input data representing a first natural language input corresponding to a first dialog, the first dialog associated with a profile identifier;

process, using a first machine learning component, the first input data to determine first output data responsive to the first natural language input;

determine first context data corresponding to the first dialog, the first context data including first entity data;

determine that the first dialog ended before completion of a goal associated with the first dialog;

based on determining that the first dialog ended before completion of the goal, store the first context data in a manner associated with the profile identifier;

receive second input data representing a second natural language input different than the first natural language input, the second input data associated with the profile identifier;

determine second entity data corresponding to the second input data;

determine, based on second input data being associated with the profile identifier and based on the second entity data corresponding to the first entity data, the second input data corresponds to the first dialog;

select a second machine learning component for processing the second input data; and based on the second input data being associated with the profile identifier and corresponding to the first dialog, process, using the second machine learning component, the second input data and the first context data to determine second output data responsive to the second natural language input.

12. The system of claim 11, wherein:

the first machine learning component is associated with a first category of functions; and the second machine learning component associated with a second category of functions.

13. The system of claim 11, wherein the at least one memory further comprises instructions that, when executed by the at least one processor, further cause the system to:

process the first output data to execute a first action; and process the second output data to execute a second action different from the first action.

14. The system of claim 11, wherein the at least one memory further comprises instructions that, when executed by the at least one processor, further cause the system to:

process the second output data to perform a shopping operation.

15. The system of claim 11, wherein the second natural language input corresponds to a second dialog different from the first dialog.

16. The system of claim 11, wherein the at least one memory further comprises instructions that, when executed by the at least one processor, further cause the system to, prior to receipt of the second input data:

store the first context data in a manner associated with a first identifier corresponding to a device that received the first input data.

17. The system of claim 11, wherein:

the instructions that cause the system to process, using the first machine learning component, the first input data comprise instructions that, when executed by the at least one processor, cause the system to perform natural language processing; and the instructions that cause the system to process, using the second machine learning component, the second input data and the first context data comprise instructions that, when executed by the at least one processor, cause the system to perform natural language processing.

18. The system of claim 11, wherein:

the first natural language input was received by a first device; and the second natural language input was received by a second device.

* * * * *